United States Patent
Zeng et al.

(10) Patent No.: US 12,476,869 B2
(45) Date of Patent: Nov. 18, 2025

(54) DEVICE ENERGY SAVING METHOD AND NETWORK DEVICE

(71) Applicant: HUAWEI TECHNOLOGIES CO., LTD., Guangdong (CN)

(72) Inventors: Yongmei Zeng, Shanghai (CN); Xiangdong He, Chengdu (CN); Chunmei Qi, Chengdu (CN); Yibu Li, Shanghai (CN); Jiang Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 18/676,214

(22) Filed: May 28, 2024

(65) Prior Publication Data

US 2024/0314033 A1  Sep. 19, 2024

Related U.S. Application Data

(63) Continuation of application No. PCT/CN2022/119855, filed on Sep. 20, 2022.

(30) Foreign Application Priority Data

Nov. 29, 2021 (CN) .......................... 202111473667.X

(51) Int. Cl.
*G06F 15/16* (2006.01)
*G06F 9/54* (2006.01)
(Continued)

(52) U.S. Cl.
CPC ...... *H04L 41/0833* (2013.01); *H04L 41/5009* (2013.01)

(58) Field of Classification Search
CPC ............. H04L 41/0833; H04L 41/5009; H04L 41/145; H04L 41/147; H04L 41/50; H04W 52/0206; H04W 24/02; Y02D 30/70
(Continued)

(56) References Cited

U.S. PATENT DOCUMENTS 9,826,476 B2 * 11/2017 Teng ................. H04W 52/0206
10,212,655 B2 * 2/2019 Uchiyama ......... H04W 52/0206
(Continued)

FOREIGN PATENT DOCUMENTS

| CN | 102447545 B | * | 12/2014 | ........ H04W 52/0206 |
| CN | 104221442 A | * | 12/2014 | ........ H04W 52/0206 |

(Continued)

OTHER PUBLICATIONS

3GPP TSG-RAN WG3 Meeting #113-e, R3-213469, "AI/ML based network energy saving." Intel Corporation, Electronic meeting, Aug. 16-26, 2021, XP052035297; 11 total pages.

*Primary Examiner* — Hamza N Algibhah
(74) *Attorney, Agent, or Firm* — Rimon PC

(57) ABSTRACT

A network device is configured to predict the service data volume of the target time period so that a determined target key performance indicator (KPI) can satisfy an actual KPI. The network device may further input the service data volume of the target time period and various resource information combinations into a prediction model group and a resource energy consumption model, predict the KPI and the energy consumption of each resource information combination by using the model, and select a resource information combination that does not affect the KPI and that has low energy consumption to adjust a carrier resource of the second network device. As a result, an energy saving effect can be achieved, thereby remedy a defect in the existing (Continued)

energy saving technology that a target KPI cannot be guaranteed.

20 Claims, 10 Drawing Sheets

(51) Int. Cl.
  *H04L 29/06* (2006.01)
  *H04L 41/0833* (2022.01)
  *H04L 41/5009* (2022.01)

(58) Field of Classification Search
  USPC .......................................................... 709/224
  See application file for complete search history.

(56) References Cited

U.S. PATENT DOCUMENTS

| | | | | |
|---|---|---|---|---|
| 10,306,671 | B2 * | 5/2019 | Li | H04W 52/325 |
| 10,827,430 | B2 * | 11/2020 | Salmela | H04W 52/0229 |
| 2011/0280144 | A1 * | 11/2011 | Mohseni | H04W 52/0245 |
| | | | | 370/252 |
| 2015/0365889 | A1 * | 12/2015 | Rajendran | H04W 16/08 |
| | | | | 455/453 |
| 2018/0288702 | A1 * | 10/2018 | Kang | H04W 52/0225 |
| 2019/0387471 | A1 * | 12/2019 | Salmela | H04W 52/0229 |
| 2021/0227461 | A1 * | 7/2021 | Zhou | H04W 36/00837 |
| 2023/0156601 | A1 * | 5/2023 | Abdelghaffar | H04L 5/0051 |
| | | | | 370/318 |
| 2023/0362809 | A1 * | 11/2023 | Dixit | H04W 24/10 |
| 2024/0056966 | A1 * | 2/2024 | Zeng | H04W 52/0212 |

FOREIGN PATENT DOCUMENTS

| | | | | | |
|---|---|---|---|---|---|
| CN | 110175693 | A | * | 8/2019 | ......... G06Q 10/0631 |
| EP | 3122099 | A1 | | 1/2017 | |
| EP | 3582558 | A1 | * | 12/2019 | ........ H04W 52/0248 |
| EP | 3445133 | B1 | * | 4/2020 | ............ H04W 8/005 |
| EP | 3522084 | B1 | * | 8/2022 | ......... G05B 19/0428 |
| JP | 2014506740 | A | * | 3/2014 | ............ H04W 88/14 |
| KR | 20210114984 | A | * | 9/2021 | ............. H04W 72/53 |
| WO | WO-2018125686 | A2 | * | 7/2018 | ........ H04W 52/0264 |
| WO | WO-2019133048 | A1 | * | 7/2019 | ............ H04W 40/24 |
| WO | WO-2020052473 | A1 | * | 3/2020 | ............ H04W 72/04 |
| WO | WO-2021050352 | A1 | * | 3/2021 | ........ H04W 52/0229 |
| WO | WO-2023051329 | A1 | * | 4/2023 | ........ H04L 41/5009 |

* cited by examiner

DEVICE ENERGY SAVING METHOD AND NETWORK DEVICE

CROSS-REFERENCE TO RELATED APPLICATIONS

This application is a continuation of International Application No. PCT/CN2022/119855, filed on Sep. 20, 2022, which claims priority to Chinese Patent Application No. 202111473667.X, filed on Nov. 29, 2021. The disclosures of the aforementioned applications are hereby incorporated by reference in their entireties.

TECHNICAL FIELD

This application relates to the communication field, and in particular, to a device energy saving method and a network device.

BACKGROUND

After a network device is deployed in a communication network, all carriers of the network device are usually in an operating state. The service data volume of a carrier fluctuates with time. When the service data volume of a carrier is small or where there are few users, high energy consumption per unit data volume or per user ensues.

Generally, an energy saving method is roughly as follows: when the service data volume is less than a first threshold and is greater than or equal to a second threshold, some carrier resources are disabled for a first duration. When the service data volume is less than the second threshold and is greater than or equal to a third threshold, some carrier resources are disabled for a second duration, and the second duration is longer than the first duration. When the service data volume is less than the third threshold, some carrier resources are disabled for a third duration, and the third duration is longer than the second duration.

Using the foregoing method may affect key performance indicators (KPIs) of the network, and cannot satisfy users' requirement on quality of service.

SUMMARY

In view of this, this application provides a device energy saving method and a network device, to predict a service data volume, determine a KPI of a target time period, predict a KPI and energy consumption of each resource information combination based on a model, and select a resource information combination that does not affect the KPI and has low energy consumption to adjust a carrier resource. In this way, the KPI and energy saving can be ensured.

According to a first aspect, a device energy saving method is provided. The method includes: A first network device determines a service data volume of a target time period based on a service data volume carried on N carriers in a target area in a historical time period; obtains a target KPI, a preset model group, and a preset condition based on the service data volume of the target time period; after generating M resource information combinations based on carrier resource information of the N carriers, sequentially selects a resource information combination from the M resource information combinations as a to-be-processed resource information combination; selects input data of each model in the preset model group from a model data set that includes signal quality information of the historical time period, the service data volume of the historical time period, a resource information combination of the historical time period, the service data volume of the target time period, and the to-be-processed resource information combination; inputs the input data of each model into a corresponding model in the preset model group; outputs a KPI of the to-be-processed resource information combination from the preset model group; compares the KPI of each resource information combination with the target KPI; then selects at least one candidate resource information combination from the plurality of resource information combinations based on a comparison result that satisfies the preset condition; inputs the service data volume of the target time period and the candidate resource information combination into a preset resource utilization model; predicts energy consumption of each candidate resource information combination based on a physical resource block utilization of each candidate resource information combination and a preset resource energy consumption model; selects a target resource information combination from the at least one candidate resource information combination; and sends the target resource information combination to a second network device, to enable the second network device to adjust, in the target time period based on the target resource information combination, a carrier resource corresponding to the target resource information combination.

The carrier resource information includes a carrier identifier, a carrier status, a quantity of carrier channels, and a carrier power level. Each resource information combination includes the carrier resource information of the N carriers, and both N and M are integers greater than 1. Each model in the preset model group is for outputting a parameter value in the KPI of the to-be-processed resource information combination, and energy consumption of the target resource information combination is less than or equal to preset energy consumption. The signal quality information may be RSRP or an RSSI.

In this implementation, the first network device can predict the KPI and the energy consumption of each resource information combination based on a plurality of preset models, to select a resource information combination that does not affect the KPI and has low energy consumption to adjust a carrier resource. This can ensure the KPI and energy saving.

In a possible implementation, that the first network device obtains a target KPI, a preset model group, and a preset condition based on the service data volume of the target time period includes: When the service data volume of the target time period is less than or equal to a first data volume, the first network device obtains the target KPI including a target traffic loss ratio and a target weak coverage ratio, the preset model group including a first preset model and a second preset model, and the preset condition including a first rule and a second rule. The first preset model is for outputting a traffic loss ratio corresponding to each resource information combination. The second preset model is for outputting a weak coverage ratio corresponding to each resource information combination. The first rule is that the traffic loss ratio of the resource information combination is less than or equal to the target traffic loss ratio. The second rule is that the weak coverage ratio of the resource information combination is less than or equal to the target weak coverage ratio. Based on this, the target KPI, the preset model group, and the preset condition in a light-load scenario may be obtained.

In another possible implementation, that the first network device obtains a target KPI, a preset model group, and a preset condition based on the service data volume of the target time period include: When the service data volume of the target time period is greater than a first data volume and is less than or equal to a second data volume, the first network device obtains the target KPI including a target traffic loss ratio, a target weak coverage ratio, and a target throughput, the preset model group including a first preset model, a second preset model, and a third preset model, and the preset condition including a first rule, a second rule, and a third rule. The first preset model is for outputting a traffic loss ratio corresponding to each resource information combination, the second preset model is for outputting a weak coverage ratio corresponding to each resource information combination, the third preset model is for outputting a throughput corresponding to each resource information combination, the first rule is that the traffic loss ratio of the resource information combination is less than or equal to the target traffic loss ratio, the second rule is that the weak coverage ratio of the resource information combination is less than or equal to the target weak coverage ratio, and the third rule is that the throughput of the resource information combination is greater than or equal to the target throughput. Based on this, the target KPI, the preset model group, and the preset condition in a medium-load scenario may be obtained.

Optionally, the target throughput is determined based on a service experience rate of the historical time period and a preset satisfaction degree. In this way, the obtained target throughput can satisfy a requirement of a user on the service experience rate, and the preset satisfaction degree can also be reached.

In another optional manner, the target throughput corresponds to a target physical resource block utilization, and the target physical resource block utilization is determined based on a traffic suppression point of the historical time period. The traffic suppression point can indicate a maximum quantity of users and maximum traffic in a linear relationship between traffic and a quantity of users. In this way, the obtained target throughput can satisfy a specific quantity of users and also satisfy a requirement of the user on a service rate.

In another optional manner, the target throughput is determined based on a throughput of the target historical time period and a preset expansion coefficient. The expansion coefficient is a ratio of a throughput of a heavy-load time period to a throughput of another time period. The service data volume of the target historical time period is greater than or equal to a preset data volume, that is, the target historical time period is the heavy-load time period. Because the throughput of the heavy-load time period is lower than the throughput of the other time period, the target throughput is determined based on the throughput of the heavy-load time period and the expansion coefficient to satisfy a requirement on a throughput in another scenario.

In another possible implementation, that the first network device selects input data corresponding to each preset model in the preset model group from a model data set includes: When the preset model group includes the first preset model and the second preset model, the first network device selects the service data volume of the historical time period, the resource information combination of the historical time period, the service data volume of the target time period, and the to-be-processed resource information combination from the model data set as input data of the first preset model, and selects the signal quality information of the historical time period, the service data volume of the historical time period, the resource information combination of the historical time period, the service data volume of the target time period, and the to-be-processed resource information combination from the model data set as input data of the second preset model. When the preset model group includes the first preset model, the second preset model, and the third preset model, the first network device selects the service data volume of the historical time period, the resource information combination of the historical time period, the service data volume of the target time period, and the to-be-processed resource information combination from the model data set as input data of the first preset model, selects the signal quality information of the historical time period, the service data volume of the historical time period, the resource information combination of the historical time period, the service data volume of the target time period, and the to-be-processed resource information combination from the model data set as input data of the second preset model, and selects the service data volume of the target time period and the to-be-processed resource information combination from the model data set as input data of the third preset model. In different scenarios, input data of different models may be selected from the model data set to output different KPIs.

In another possible implementation, that the first network device predicts energy consumption of each candidate carrier resource set based on the physical resource block utilization of each candidate carrier resource set and a preset resource energy consumption model includes: The first network device predicts the energy consumption of each candidate carrier resource set based on the physical resource block utilization of each candidate carrier resource set, a quantity of available channels of each working carrier, and the preset resource energy consumption model. Because carrier energy consumption is related to a quantity of carrier channels, adding a quantity of channels of the working carrier as input data of a model can improve accuracy of the model.

In another possible implementation, that the first network device selects a target resource information combination from the at least one candidate resource information combination includes: The first network device selects a candidate resource information combination corresponding to minimum energy consumption from the at least one candidate resource information combination as the target resource information combination. In this way, the resource information combination with the minimum energy consumption may be determined. Adjusting a carrier resource based on the resource information combination can save maximum energy consumption.

In another possible implementation, that the first network device selects a target resource information combination from the at least one candidate resource information combination includes: The first network device determines, based on a traffic loss ratio and a weak coverage ratio that are of each candidate resource information combination, and the energy consumption of the candidate resource information combination, a cost value corresponding to each candidate resource information combination, and determines a target resource information combination corresponding to a minimum cost value from the at least one candidate resource information combination. In this way, the cost values that correspond to the traffic loss ratio and the weak coverage ratio and that are in the light-load scenario may be obtained, and impact of energy saving on the KPI may be predicted, to select a resource information combination that is energy saving and that has little impact on the KPI.

In another possible implementation, that the first network device selects a target resource information combination from the at least one candidate resource information combination includes: The first network device determines, based on a throughput of a working carrier resource, a traffic loss ratio, and a weak coverage ratio in each candidate resource information combination, and the energy consumption of the candidate resource information combination, a cost value corresponding to each candidate resource information combination; and determines a target resource information combination corresponding to a minimum cost value from the at least one candidate resource information combination. In this way, the cost values that correspond to the traffic loss ratio, the weak coverage ratio, and the throughput and that are in the medium-load scenario may be obtained, and the impact of energy saving on the KPI may be predicted, to select a resource information combination that is energy saving and that has little impact on the KPI.

In another possible implementation, the first network device further includes a resource combination status interface configured to transmit the target resource information combination to the second network device.

According to a second aspect, a method of establishing a resource utilization model is provided. The method includes: obtaining samples of a plurality of time periods, where each sample includes a service data volume, a resource information combination of a target area, and a physical resource utilization of the resource information combination; and training the samples of the plurality of time periods to obtain a resource utilization model. The training algorithm may be, but is not limited to, a GBDT algorithm, an xgBoost algorithm, or a random forest algorithm. The resource information combination includes carrier resource information of all or a part of carriers in the target area. The carrier resource information includes at least one of a carrier, a carrier channel, and a carrier power level. The resource utilization model may predict, based on an input service data volume and an input resource information combination, a physical resource utilization of the resource information combination.

According to a third aspect, a method of establishing a resource energy consumption model is provided. The method includes: obtaining samples of a plurality of time periods, where each sample includes a resource information combination of a target area, and a physical resource block utilization and an energy consumption value that are of the resource information combination; and training the samples of the plurality of time periods to obtain a resource energy consumption model. The training algorithm may be, but is not limited to, a GBDT algorithm, an xgBoost algorithm, or a random forest algorithm. The resource information combination includes carrier resource information of all or a part of carriers in the target area. The carrier resource information includes at least one of a carrier, a carrier channel, and a carrier power level. The resource energy consumption model may predict, based on an input resource information combination and an input physical resource block utilization of the resource information combination, an energy consumption value of the resource information combination.

According to a fourth aspect, a method of establishing a preset model group is provided. The method includes: obtaining a first sample set, where the first sample set includes a service data volume of a first group of time periods, a resource information combination of the first group of time periods, a service data volume of a second group of time periods, and a resource information combination and a traffic loss ratio that are of the second group of time periods; training the first sample set to obtain a first preset model; obtaining a second sample set, where the second sample set includes the service data volume of the first group of time periods, the resource information combination of the first group of time periods, the service data volume of the second group of time periods, and the resource information combination and a weak coverage ratio that are of the second group of time periods; and training the second sample set to obtain a second preset model.

The training algorithm may be, but is not limited to, a GBDT algorithm, an xgBoost algorithm, or a random forest algorithm. The resource information combination includes carrier resource information of all or a part of carriers in a target area. The carrier resource information includes at least one of a carrier, a carrier channel, and a carrier power level. The first preset model may predict, based on a service data volume and the resource information combination that are of two time periods, a traffic loss ratio of a resource information combination. The second preset model may predict, based on the service data volume and the resource information combination that are of the two time periods, a weak coverage ratio of the resource information combination.

In an optional embodiment, the method further includes: obtaining a third sample set, where each sample in the third sample set includes a service data volume, a resource information combination, and a throughput; and training the third sample set to obtain a third preset model. The third preset model may predict, based on an input service data volume and an input resource information combination, a throughput of the resource information combination.

According to a fifth aspect, a network device is provided. The network device includes a service prediction unit, an obtaining unit, a generation unit, a first model processing unit, a comparison unit, a first selection unit, a second model processing unit, a third model processing unit, a second selection unit, and a sending unit. In this disclosure, "unit" may refer to a hardware component, a software module or a device combining hardware and software. The service prediction unit is configured to determine a service data volume of a target time period based on a service data volume carried on N carriers in a target area in a historical time period. The obtaining unit is configured to obtain a target key performance indicator KPI, a preset model group, and a preset condition based on the service data volume of the target time period. The generation unit is configured to generate M resource information combinations based on carrier resource information of the N carriers, where each resource information combination includes the carrier resource information of the N carriers, and both N and M are integers greater than 1. The first model processing unit is configured to: sequentially select a resource information combination from the M resource information combinations as a to-be-processed resource information combination; select input data of each model in the preset model group from a model data set; and input the input data of each model into a corresponding model in the preset model group, where the model data set includes signal quality information of the historical time period, the service data volume of the historical time period, a resource information combination of the historical time period, the service data volume of the target time period, and the to-be-processed resource information combination, and each model in the preset model group is for outputting a parameter value in a KPI corresponding to the to-be-processed resource information combination. The comparison unit is configured to compare the KPI of each resource information combination with the target KPI. The first selection unit selects at least one candidate resource information combination from the plurality of resource information combinations based on a comparison result that satisfies the preset condition. The second model processing unit is configured to input the service data volume of the target time period and the candidate resource information combination into a resource utilization model, where the resource utilization model is for outputting a physical resource block utilization of the candidate resource information combination. The third model processing unit is configured to predict energy consumption of each candidate resource information combination based on the physical resource block utilization of each candidate resource information combination and a preset resource energy consumption model. The second selection unit is configured to select a target resource information combination from the at least one candidate resource information combination, where energy consumption of the target resource information combination is less than or equal to preset energy consumption. The sending unit is configured to send the target resource information combination to a second network device, where the target resource information combination is for adjusting, in the target time period, a carrier resource corresponding to the target resource information combination. The network device may predict the KPI and the energy consumption of each resource information combination, to select a resource information combination that does not affect the KPI and that has low energy consumption to adjust a carrier resource. This can ensure the KPI and energy saving.

In another possible implementation, the obtaining unit is configured to: when the service data volume of the target time period is less than or equal to a first data volume, obtain the target KPI including a target traffic loss ratio and a target weak coverage ratio, the preset model group including a first preset model and a second preset model, and the preset condition including a first rule and a second rule, where the first preset model is for outputting a traffic loss ratio corresponding to each resource information combination, the second preset model is for outputting a weak coverage ratio corresponding to each resource information combination, the first rule is that the traffic loss ratio of the resource information combination is less than or equal to the target traffic loss ratio, and the second rule is that the weak coverage ratio of the resource information combination is less than or equal to the target weak coverage ratio.

In another possible implementation, the obtaining unit is configured to: when the service data volume of the target time period is greater than a first data volume and less than or equal to a second data volume, obtain the target KPI including a target traffic loss ratio, a target weak coverage ratio, and a target throughput, the preset model group including a first preset model, a second preset model, and a third preset model, and the preset condition including a first rule, a second rule, and a third rule, where the first preset model is for outputting a traffic loss ratio corresponding to each resource information combination, the second preset model is for outputting a weak coverage ratio corresponding to each resource information combination, the third preset model is for outputting a throughput corresponding to each resource information combination, the first rule is that the traffic loss ratio of the resource information combination is less than or equal to the target traffic loss ratio, the second rule is that the weak coverage ratio of the resource information combination is less than or equal to the target weak coverage ratio, and the third rule is that the throughput of the resource information combination is greater than or equal to the target throughput.

In another possible implementation, the target throughput is determined based on a service experience rate of the historical time period and a preset satisfaction degree.

In another possible implementation, the target throughput corresponds to a target physical resource block utilization, and the target physical resource block utilization is determined based on a traffic suppression point of the historical time period.

In another possible implementation, the target throughput is determined based on a throughput of the target historical time period and a preset expansion coefficient, and the service data volume of the target historical time period is greater than or equal to a preset data volume.

In another possible implementation, the first model processing unit is configured to: when the preset model group includes the first preset model and the second preset model, select, for the first network device, the service data volume of the historical time period, the resource information combination of the historical time period, the service data volume of the target time period, and the to-be-processed resource information combination from the model data set as input data of the first preset model, and select the signal quality information of the historical time period, the service data volume of the historical time period, the resource information combination of the historical time period, the service data volume of the target time period, and the to-be-processed resource information combination from the model data set as input data of the second preset model; or when the preset model group includes the first preset model, the second preset model, and the third preset model, select the service data volume of the historical time period, the resource information combination of the historical time period, the service data volume of the target time period, and the to-be-processed resource information combination from the model data set as input data of the first preset model, select the signal quality information of the historical time period, the service data volume of the historical time period, the resource information combination of the historical time period, the service data volume of the target time period, and the to-be-processed resource information combination from the model data set as input data of the second preset model, and select the service data volume of the target time period and the to-be-processed resource information combination from the model data set as input data of the third preset model.

In another possible implementation, the third model processing unit is configured to predict the energy consumption of each candidate carrier resource set based on the physical resource block utilization of each candidate carrier resource set, a quantity of available channels of each working carrier, and the preset resource energy consumption model.

In another possible implementation, the second selection unit is configured to select a candidate resource information combination corresponding to minimum energy consumption from the at least one candidate resource information combination as the target resource information combination.

In another possible implementation, the second selection unit is configured to: determine, based on a traffic loss ratio and a weak coverage ratio that are of each candidate resource information combination, and the energy consumption of the candidate resource information combination, a cost value corresponding to each candidate resource information combination, and determine a target resource information combination corresponding to a minimum cost value from the at least one candidate resource information combination.

In another possible implementation, the second selection unit is configured to: determine, based on a throughput of a working carrier resource, a traffic loss ratio, and a weak coverage ratio in each candidate resource information combination, and the energy consumption of the candidate resource information combination, a cost value corresponding to each candidate resource information combination, and determine a target resource information combination corresponding to a minimum cost value from the at least one candidate resource information combination.

In another possible implementation, the first network device includes a resource combination status interface, configured to transmit the target resource information combination to the second network device.

For term explanations, steps performed by the network device, and beneficial effects that are in the fifth aspect, refer to corresponding descriptions in the first aspect.

According to a sixth aspect, a network device is provided. The network device includes a data obtaining unit and a training unit. The data obtaining unit is configured to obtain samples of a plurality of time periods, where each sample includes a service data volume, a resource information combination of a target area, and a physical resource utilization of the resource information combination. The training unit is configured to train the samples of the plurality of time periods to obtain a resource utilization model. For term explanations, steps performed by the network device, and beneficial effects that are in the sixth aspect, refer to corresponding descriptions in the second aspect.

According to a seventh aspect, a network device is provided. The network device includes a data obtaining unit and a training unit. The data obtaining unit is configured to obtain samples of a plurality of time periods, where each sample includes a resource information combination of a target area, and a physical resource block utilization and an energy consumption value that are of the resource information combination. The training unit is configured to train the samples of the plurality of time periods to obtain a resource energy consumption model. For term explanations, steps performed by the network device, and beneficial effects that are in the seventh aspect, refer to corresponding descriptions in the third aspect.

According to an eighth aspect, a network device is provided. The network device includes a data obtaining unit and a training unit. The data obtaining unit is configured to obtain a first sample set, where the first sample set includes a service data volume of a first group of time periods, a resource information combination of the first group of time periods, a service data volume of a second group of time periods, and a resource information combination and a traffic loss ratio that are of the second group of time periods. The training unit is configured to train the first sample set to obtain a first preset model. The data obtaining unit is further configured to obtain a second sample set, where the second sample set includes the service data volume of the first group of time periods, the resource information combination of the first group of time periods, the service data volume of the second group of time periods, and the resource information combination and a weak coverage ratio that are of the second group of time periods. The training unit is further configured to train the second sample set to obtain a second preset model. For term explanations, steps performed by the network device, and beneficial effects that are in the eighth aspect, refer to corresponding descriptions in the fourth aspect.

In an optional embodiment, the data obtaining unit is further configured to obtain a third sample set, where each sample in the third sample set includes a service data volume, a resource information combination, and a throughput. The training unit is further configured to train the third sample set to obtain a third preset model.

According to a ninth aspect, a network device is provided, including a processor and a memory. The memory is configured to store a program. The processor executes the program to implement the device energy saving method according to the first aspect, the method of establishing a resource utilization model according to the second aspect, the method of establishing a resource energy consumption model according to the third aspect, or the method of establishing a preset model group according to the fourth aspect.

According to a tenth aspect, a computer-readable storage medium is provided. The computer-readable storage medium stores instructions. When the instructions are run on a computer, the computer is enabled to perform the method according to the foregoing aspects.

According to an eleventh aspect, a computer program product including instructions is provided. When the computer program product runs on a computer, the computer is enabled to perform the method according to the foregoing aspects.

According to a twelfth aspect, a chip system is provided. The chip system includes at least one processor. The processor is coupled to a memory. The memory is configured to store a computer program or instructions. The processor is configured to execute the computer program or the instructions to implement the method according to the foregoing aspects.

DESCRIPTION OF EMBODIMENTS

Figure 1:
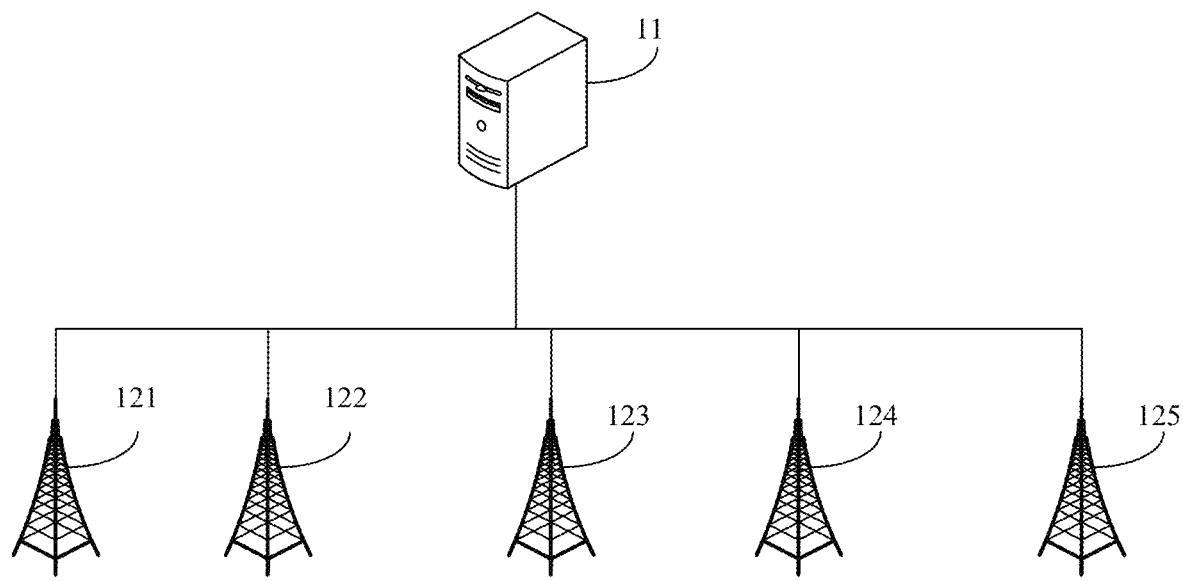
FIG. 1 is a diagram of a wireless communication system according to an embodiment of this application.

A device energy saving method in this application may be applied to a multi-frequency networking scenario. Refer to FIG. 1. In an example of the multi-frequency networking scenario, a wireless communication system includes a mobile network element 11, a base station 121, a base station 122, a base station 123, a base station 124, and a base station 125. A mobile broadband automation engine (MAE) is deployed in the mobile network element 11. The base station 121, the base station 122, the base station 123, the base station 124, and the base station 125 are managed via the MAE.

A carrier resource of each base station includes a carrier and a carrier channel. Carrier resource information may include but is not limited to a carrier identifier, a carrier status, a quantity of carrier channels, and carrier power. Each base station may be configured with one or more carriers. The carrier status may be enabled or disabled. The carrier power may be classified into a plurality of levels. For example, the carrier power is classified into 10 levels, and a power level range ranges from 0 dB (dB) to 10 dB (dB). A quantity of carrier power levels and the power level range may be set based on an actual situation.

A total quantity of channels corresponding to each carrier is preconfigured, for example, 64 channels or 32 channels. When adjusting the carrier resource, one or more channels may be enabled or disabled. For example, a total quantity of channels corresponding to a carrier is 64, and a quantity of available channels may be but is not limited to 64, 32, 16, and 8. In an actual application, a percentage of available channels is a ratio of the quantity of available channels to the total quantity of channels. The percentage of the available channels may be but is not limited to 1, ½, ¼, or ⅛.

Figure 2:
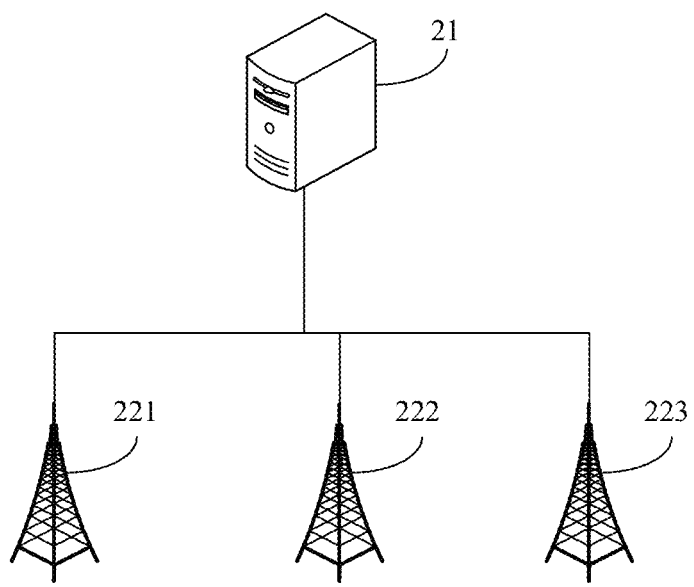
FIG. 2 is another diagram of a wireless communication system according to an embodiment of this application.

In another example of the multi-frequency networking scenario, the wireless communication system includes a central unit (CU) and a distributed unit (DU). Each CU is connected to one or more DUs. Refer to FIG. 2. In another example, the wireless communication system includes a CU 21, a DU 221, a DU 222, and a DU 223. It should be understood that quantities of mobile network elements and base stations that are in the wireless communication system are not limited to the foregoing examples. A quantity of CUs and a quantity of DUs in the base station are not limited to the foregoing examples.

Figure 3A:
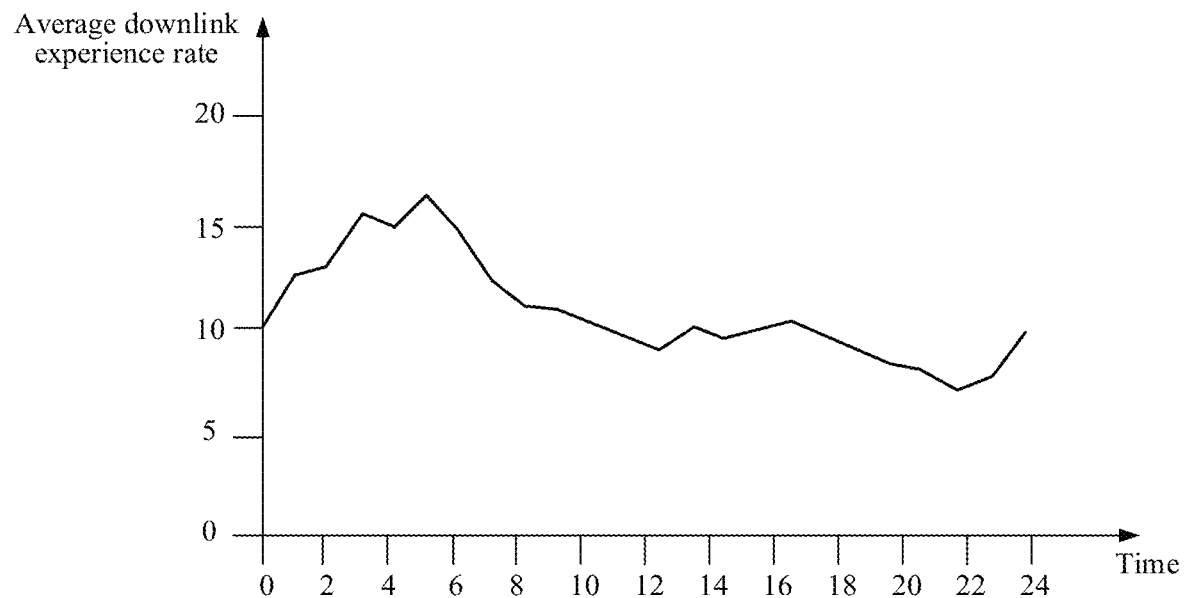
FIG. 3A is a diagram of a downlink experience rate change curve according to an embodiment of this application.
Figure 3B:
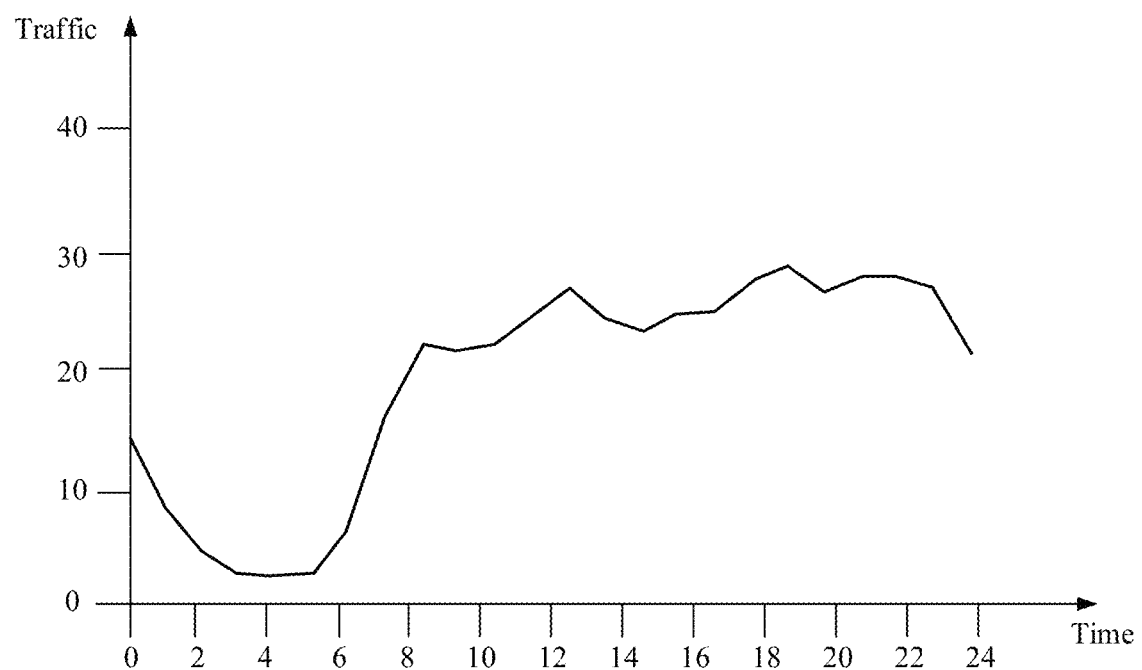
FIG. 3B is a diagram of a traffic change curve according to an embodiment of this application.

In another example, the wireless communication system includes one mobile network element and 60 base stations. An average downlink experience rate of the 60 base stations is shown in FIG. 3A. Traffic of the 60 base stations is shown in FIG. 3B. A physical resource block utilization of the 60 base stations is shown in FIG. 3C.

Refer to FIG. 3A. A peak value of the average downlink experience rate is at 4 a.m., and a valley value of the average downlink experience rate is at 9 p.m. The average downlink experience rate at 4 a.m. is 32 Mbps (Mbps), and the average downlink experience rate at 9 p.m. is 14 Mbps. It can be learned that the peak value of the average downlink experience rate in this area is twice greater than the valley value of the average downlink experience rate.

Refer to FIG. 3B. A peak value of the traffic is at 6 p.m., and a valley value of the traffic is at 4 a.m. It can be learned that the peak value of the traffic is about nine times the valley value of the traffic.

Figure 3C:
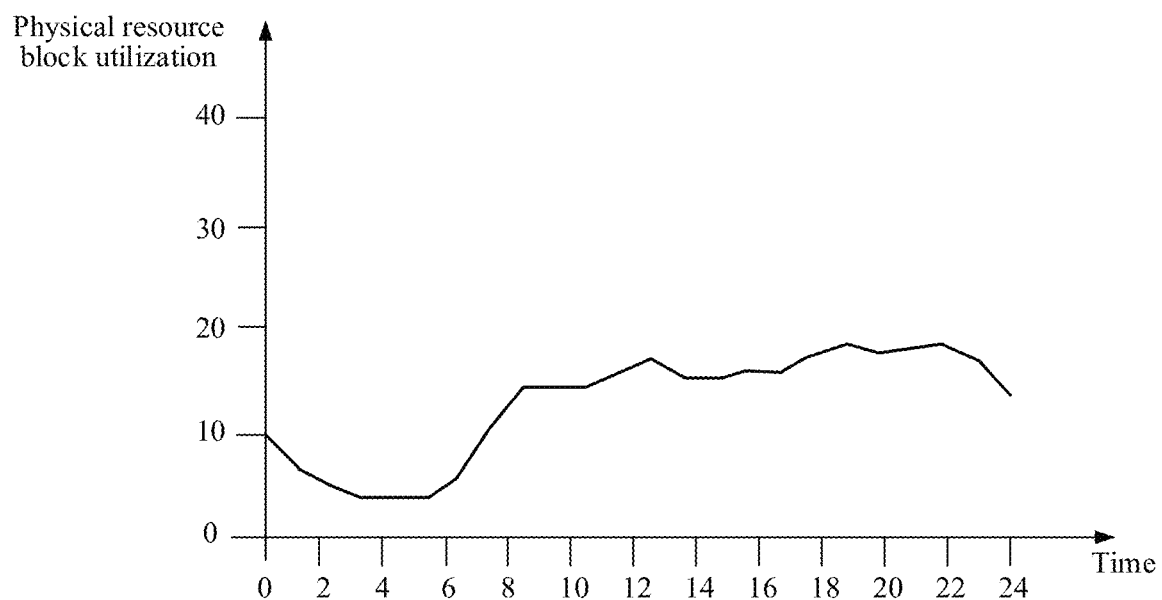
FIG. 3C is a diagram of a physical resource block utilization change curve according to an embodiment of this application.

Refer to FIG. 3C. A peak value of the physical resource block utilization is at 6 p.m., and a valley value of the physical resource block utilization is at 4 a.m. It can be learned that the peak value of the physical resource block utilization is about three times the valley value of the physical resource block utilization. It can be learned from FIG. 3A, FIG. 3B, and FIG. 3C that KPIs of the wireless communication system are unevenly distributed in time and space.

According to an existing energy saving method, a plurality of service data volume thresholds are preconfigured, corresponding disabled duration is determined based on an interval of service data volumes. Some carriers are disabled based on the disabled duration, or some carrier channels are disabled based on the disabled duration. The smaller the service data volume, the longer the disabled duration. In this case, the disabled duration is set based on experience. This may lead to a failure of satisfying a requirement on the KPI by a network KPI. The network KPI includes a user experience rate, a physical resource block utilization, traffic, and the like.

Figure 4A:
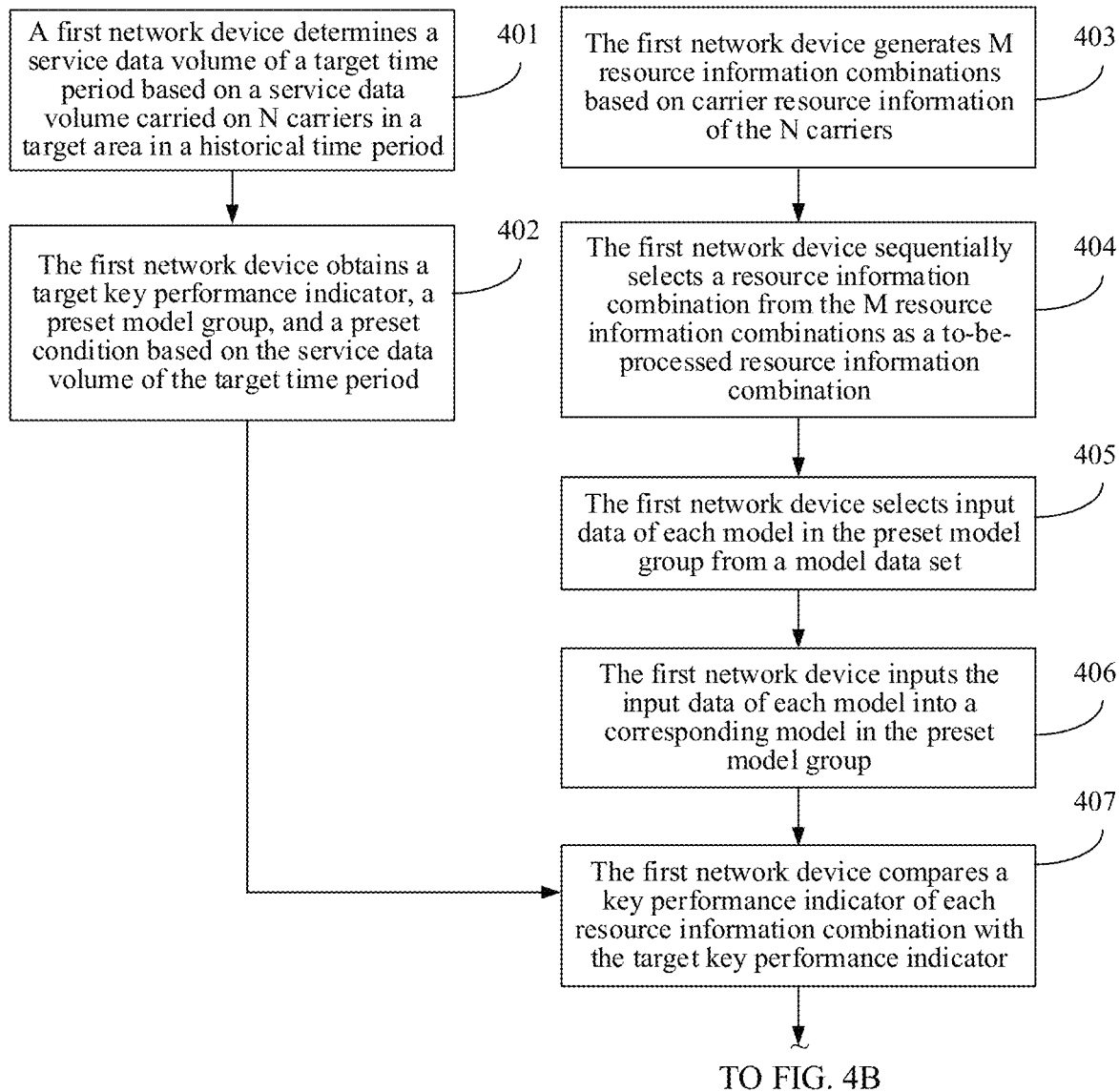
FIG. 4A and FIG. 4B is a flowchart of a device energy saving method according to an embodiment of this application.
Figure 4B:
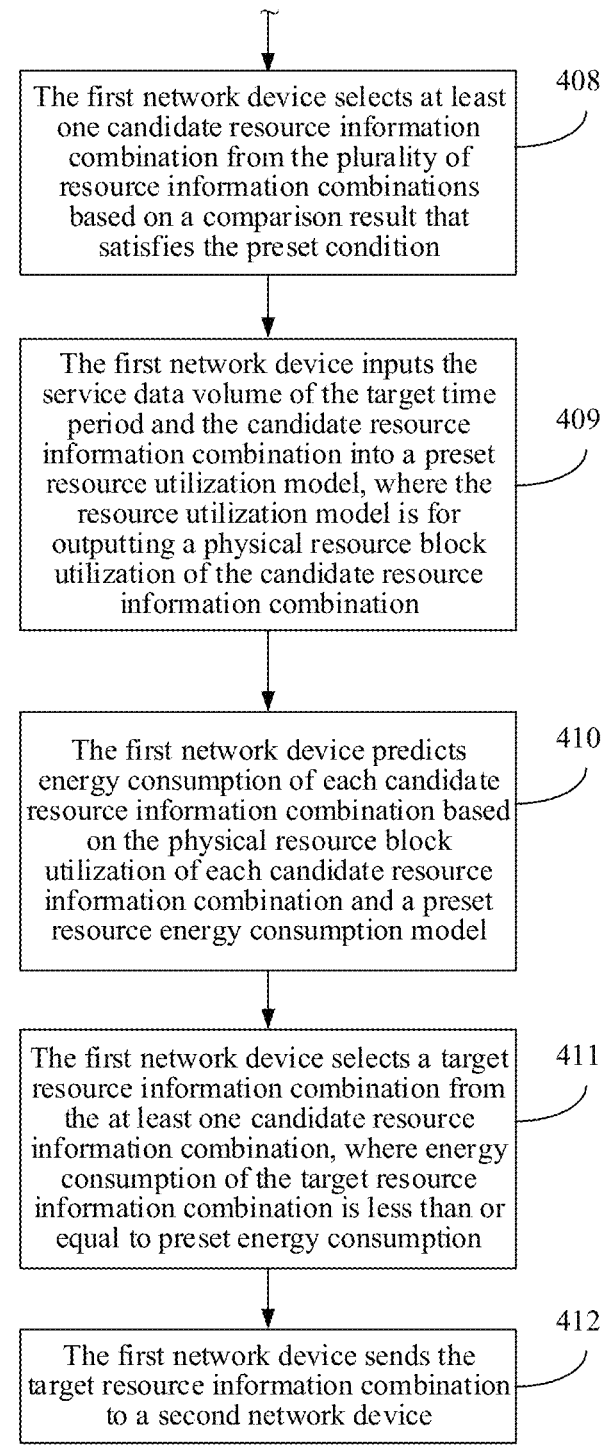

To resolve the foregoing problem, this application provides a device energy saving method to obtain carrier sets in various states and KPIs of the carrier sets. The KPIs of the carrier sets are compared with a specified KPI, a proper carrier set is selected based on a comparison result, and a carrier is disabled or a carrier channel is disabled based on the selected carrier set. In this way, the KPI can be ensured and energy can be saved. The following describes the device energy saving method. Refer to FIG. 4A and FIG. 4B. An embodiment of the device energy saving method in this application includes the following steps.

Step 401: A first network device determines a service data volume of a target time period based on a service data volume carried on N carriers in a target area in a historical time period.

In some embodiments, when the first network device is a mobile network element, the target area includes one or more cells. When the first network device is a base station, the target area is a cell. The N carriers may be all or a part of carriers in the target area. The target time period may be n hours, n minutes, n seconds, or n microseconds. A value of n may be set based on an actual situation. This is not limited in this application.

Optionally, step 401 includes: The first network device processes, by using a time sequence prediction method, a service data volume carried on N carriers in a target area in a historical time period to obtain a service data volume of a target time period. Duration of the historical time period may be set based on an actual situation, for example, one or more weeks, one or more days, or one or more hours.

Step 402: The first network device obtains a target key performance indicator, a preset model group, and a preset condition based on the service data volume of the target time period.

In a light-load scenario, a low throughput may be caused by a service. Therefore, the throughput may be ignored. Therefore, different KPIs may be used in the light-load scenario and a medium-load scenario.

In an optional embodiment, when the service data volume of the target time period is less than or equal to a first data volume, it indicates that the service data volume of the target time period is a data volume in the light-load scenario. The first network device obtains the target KPI including a target traffic loss ratio and a target weak coverage ratio, the preset model group including a first preset model and a second preset model, and the preset condition including a first rule and a second rule. When the service data volume of the target time period is greater than a first data volume and is less than or equal to a second data volume, it indicates that the service data volume of the target time period is a data volume in the medium-load scenario. The first network device obtains the target KPI including a target traffic loss ratio, a target weak coverage ratio, and a target throughput, the preset model group including a first preset model, a second preset model, and a third preset model, and the preset condition including a first rule, a second rule, and a third rule. Values of the first data volume and the second data volume may be set based on the actual situation. This is not limited in this application.

The first preset model is for outputting a traffic loss ratio corresponding to each resource information combination. The second preset model is for outputting a weak coverage ratio corresponding to each resource information combination. The third preset model is for outputting a throughput corresponding to each resource information combination. The first rule is that the traffic loss ratio of the resource information combination is less than or equal to the target traffic loss ratio. The second rule is that the weak coverage ratio of the resource information combination is less than or equal to the target weak coverage ratio. The third rule is that the throughput of the resource information combination is greater than or equal to the target throughput. The target traffic loss ratio, the target weak coverage ratio, and the target throughput may all be set based on the actual situation. This is not limited in this application.

Step 403: The first network device generates M resource information combinations based on carrier resource information of the N carriers.

The carrier resource information includes a carrier identifier, a carrier status, a quantity of carrier channels, and a carrier power level. Each resource information combination includes the carrier resource information of the N carriers, and both N and M are integers greater than 1. Optionally, the M resource information combinations include all combinations of the carrier resource information of the N carriers.

Carriers in the target area can be classified into basic carriers and capacity carriers. The basic carrier cannot be disabled, and the capacity carrier can be enabled or disabled. For a plurality of carriers that share same radio frequency, the carriers are disabled or enabled at the same time.

In an example, the M resource information combinations are shown in Table 1.

TABLE 1

| Carrier identifier | Carrier status | Quantity of carrier channels | Carrier power level |
|---|---|---|---|
| $CA_1$ | 1 | 32 | 0 |
| $CA_2$ | 0 | NULL | NULL |
| ... | ... | ... | ... |
| $CA_M$ | 1 | 64 | 0 |

The carrier power level indicates a carrier adjustment amplitude. When the carrier power level is 0, it indicates that power remains unchanged. NULL indicates that a value is null.

Step 404: The first network device sequentially selects a resource information combination from the M resource information combinations as a to-be-processed resource information combination.

Step 405: The first network device selects input data of each model in the preset model group from a model data set.

The model data set includes signal quality information of the historical time period, the service data volume of the historical time period, a resource information combination of the historical time period, the service data volume of the target time period, and the to-be-processed resource information combination. The signal quality information may be, but is not limited to, reference signal received power (RSRP) or a received signal strength indication (RSSI).

Step 406: The first network device inputs the input data of each model into a corresponding model in the preset model group.

Specifically, after the first network device inputs the input data into each model in the preset model group, each model in the preset model group may output a parameter value in a KPI of the to-be-processed resource information combination. In this way, the preset model group may output the key performance indicator of the to-be-processed resource information combination. Key performance indicators of all the resource information combinations may be sequentially output.

When the service data volume of the target time period is less than or equal to the first data volume, the first network device separately inputs the input data into the first preset model and the second preset model. The first preset model outputs the traffic loss ratio corresponding to each resource information combination. The second preset model outputs the weak coverage ratio corresponding to each resource information combination.

When the service data volume of the target time period is greater than the first data volume and is less than or equal to the second data volume, the first network device separately inputs the input data into the first preset model, the second preset model, and the third preset model. The first preset model outputs the traffic loss ratio corresponding to each resource information combination. The second preset model outputs the weak coverage ratio corresponding to each resource information combination. The third preset model outputs the throughput corresponding to each resource information combination.

Step 407: The first network device compares the key performance indicator of each resource information combination with the target key performance indicator.

When the target KPI includes the target traffic loss ratio and the target weak coverage ratio, the first network device compares the traffic loss ratio of each resource information combination with the target traffic loss ratio, and compares the weak coverage ratio of each resource information combination with the target weak coverage ratio. When a traffic loss ratio of an $i^{th}$ resource information combination is less than or equal to the target traffic loss ratio and a weak coverage ratio of the $i^{th}$ resource information combination is less than or equal to the target weak coverage ratio, it is determined that a result of comparison between a KPI of the $i^{th}$ resource information combination and the target KPI satisfies the preset condition. When a traffic loss ratio of an $i^{th}$ resource information combination is greater than the target traffic loss ratio, and/or a weak coverage ratio of the $i^{th}$ resource information combination is greater than the target weak coverage ratio, it is determined that a result of comparison between a KPI of the $i^{th}$ resource information combination and the target KPI does not satisfy the preset condition. i is a positive integer not greater than M.

When the target KPI includes the target traffic loss ratio, the target weak coverage ratio, and the target throughput, the first network device compares the traffic loss ratio of each resource information combination with the target traffic loss ratio, compares the weak coverage ratio of each resource information combination with the target weak coverage ratio, and compares the throughput of each resource information combination with the target throughput. When a traffic loss ratio of an $i^{th}$ resource information combination is less than or equal to the target traffic loss ratio, a weak coverage ratio of the $i^{th}$ resource information combination is less than or equal to the target weak coverage ratio, and a throughput of the $i^{th}$ resource information combination is greater than or equal to the target throughput, it is determined that a result of comparison between a KPI of the $i^{th}$ resource information combination and the target KPI satisfies the preset condition. When a traffic loss ratio of an $i^{th}$ resource information combination is greater than the target traffic loss ratio, a weak coverage ratio of the $i^{th}$ resource information combination is greater than the target weak coverage ratio, and/or a throughput of the $i^{th}$ resource information combination is less than the target throughput, it is determined that a result of comparison between a KPI of the $i^{th}$ resource information combination and the target KPI does not satisfy the preset condition.

Step 408: The first network device selects at least one candidate resource information combination from the plurality of resource information combinations based on a comparison result that satisfies the preset condition.

Step 409: The first network device inputs the service data volume of the target time period and the candidate resource information combination into a preset resource utilization model, where the resource utilization model is for outputting a physical resource block utilization of the candidate resource information combination.

Step 410: The first network device predicts energy consumption of each candidate resource information combination based on the physical resource block utilization of each candidate resource information combination and a preset resource energy consumption model.

Step 411: The first network device selects a target resource information combination from the at least one candidate resource information combination, where energy consumption of the target resource information combination is less than or equal to preset energy consumption.

The preset energy consumption may be set based on the actual situation. This is not limited in this application. A value of the preset energy consumption may be but is not limited to 1500 watts.

Step 412: The first network device sends the target resource information combination to a second network device.

The second network device adjusts, in the target time period based on the target resource information, a carrier resource corresponding to the target resource information combination. The adjusting of the carrier resource includes at least one of the following operations: enabling a carrier, disabling a carrier, enabling a carrier channel, disabling a carrier channel, and adjusting carrier power.

In some embodiments, the first network device may predict the service data volume of the target time period. In this way, the determined target KPI can satisfy an actual KPI. The first network device may further input the service data volume of the target time period and various resource information combinations into a prediction model group and a resource energy consumption model, predict the KPI and energy consumption of each resource information combination by using the model, and select a resource information combination that does not affect the KPI and that has low energy consumption to adjust a carrier resource of the second network device. In the method, the target KPI can be satisfied, and an energy saving effect can be achieved, thereby overcoming a defect that an existing energy saving technology cannot ensure the KPI.

In this application, the target throughput may be determined in a plurality of manners. The following describes the manners.

In another optional embodiment, the target throughput is determined based on a service experience rate of the historical time period and a preset satisfaction degree.

In some embodiments, the carrier may carry a plurality of services, and each service has a corresponding rate. The rate is also referred to as an experience rate or a service experience rate. The rate includes a downlink experience rate and an uplink experience rate. The experience rate described in this application is usually the downlink experience rate. In an example, a first satisfaction degree is 80%, and a second satisfaction degree is 90%. A correspondence between a plurality of services and a rate that are of a time period is shown in Table 2. A unit of the rate in Table 2 is megabit per second.

TABLE 2

| Service name | Actual rate (Mbps) | Rate threshold of a first satisfaction degree | Rate threshold of a second satisfaction degree |
|---|---|---|---|
| Network voice service | 0.1 | 0.2 | 0.4 |
| Instant messaging | 0.2 | 0.2 | 0.4 |
| Network video service | 0.3 | 0.4 | 0.5 |
| Game | 0.7 | 0.8 | 1 |
| 240P video | 0.9 | 1 | 1.5 |
| 360P video | 1.3 | 1.5 | 2 |
| 500-kilobyte web | 2 | 2 | 4 |
| 480P video | 2.2 | 2 | 4 |
| Social network service | 2.2 | 2 | 4 |
| 1-megabyte web | 4 | 5 | 10 |
| 720P video | 4.7 | 5 | 10 |
| Email | 7 | 10 | 20 |
| 2-megabyte web | 8 | 10 | 20 |
| File transfer | 8.9 | 10 | 20 |
| Cloud service | 8.9 | 10 | 20 |
| 1080P video | 9.1 | 10 | 20 |

Figure 5:
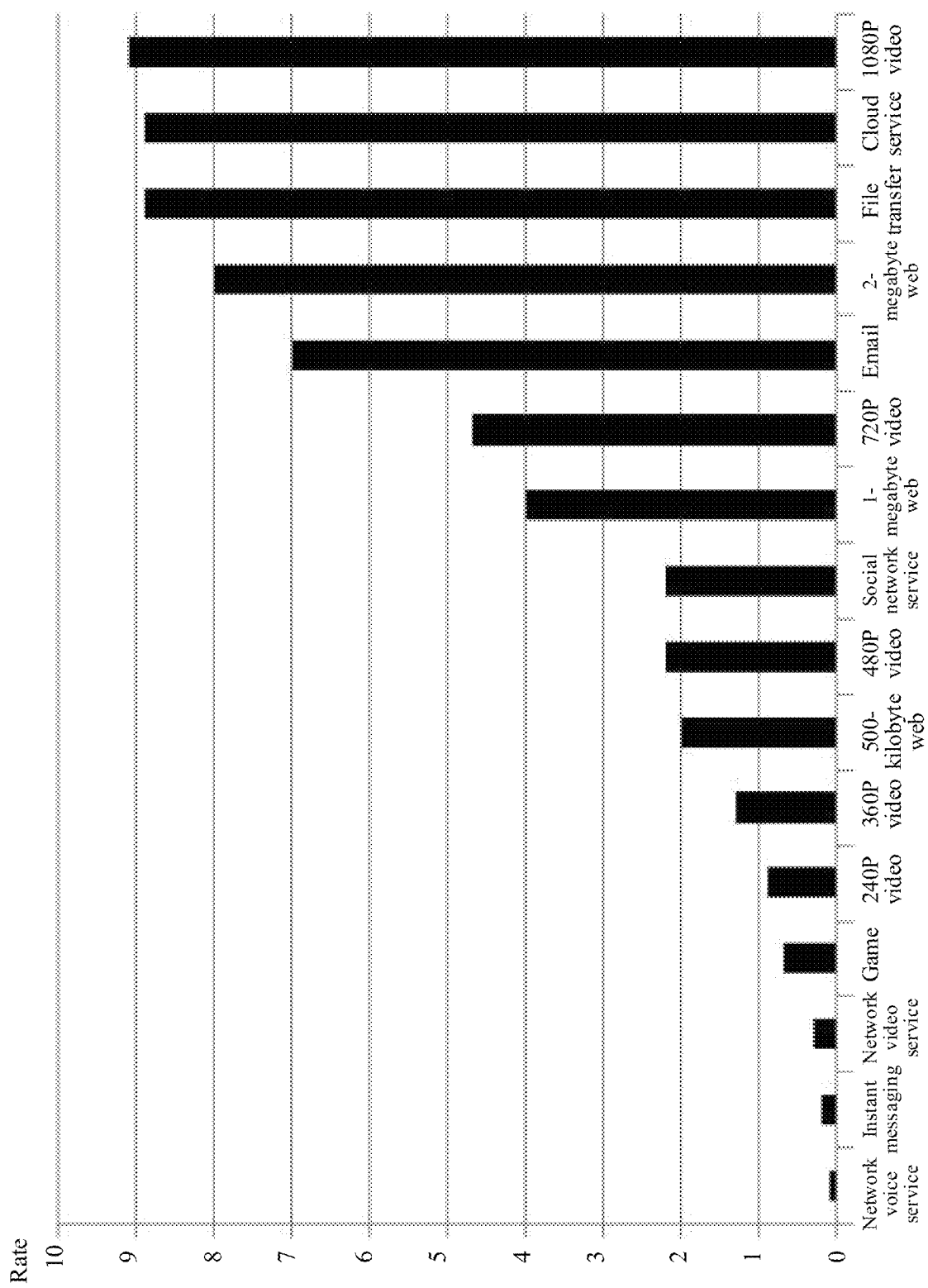
FIG. 5 is a diagram of a correspondence between a service and a rate according to an embodiment of this application.

FIG. 5 shows a correspondence between the service and the actual rate in Table 2.

Figure 6:
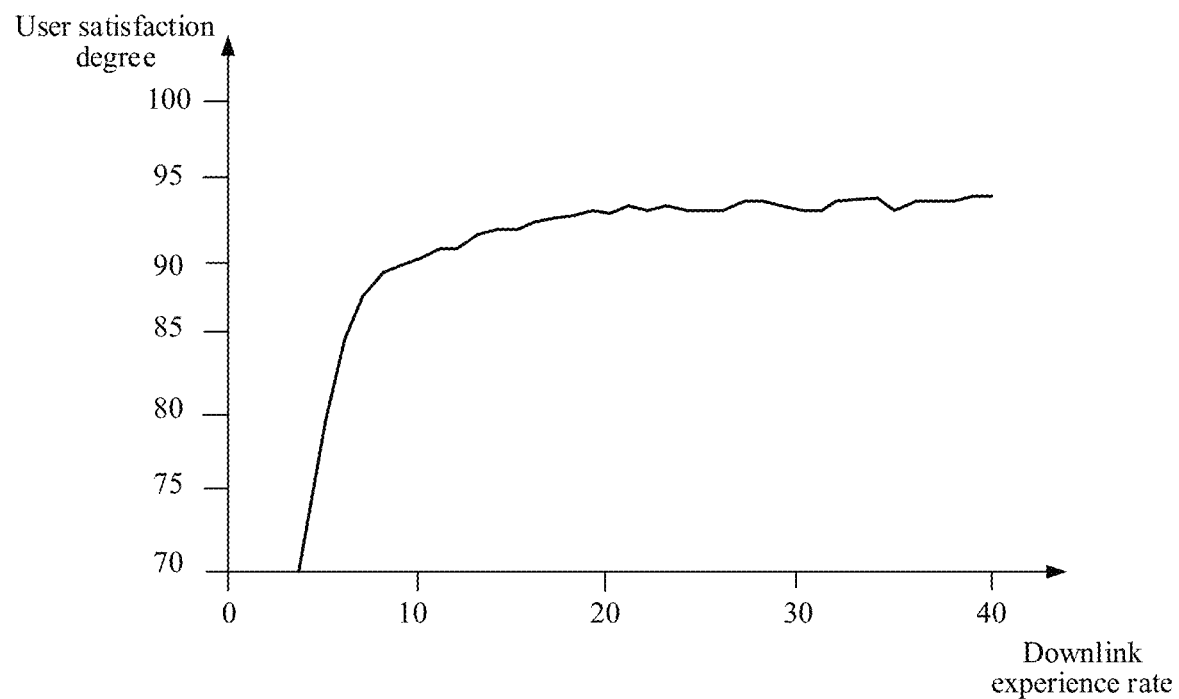
FIG. 6 is a diagram of a correspondence between a downlink experience rate and a user satisfaction degree according to an embodiment of this application.

FIG. 6 shows a correspondence between a user satisfaction degree and a rate of the 720P video service. Refer to FIG. 6. When the rate is 5 Mbps, the user satisfaction degree is 80%. When the rate is 10 Mbps, the user satisfaction degree is 90%.

As shown in Table 2, when rates of the 480P video service and the 500 KB web service are both 2 Mbps, the user satisfaction degree is 80%. When rates of the 720P video service and the 1 MB web service are both 5 Mbps, the user satisfaction degree is 80%. When rates of the 1080P video service and the 2 MB web service are both 10 Mbps, the user satisfaction degree is 80%.

Optionally, the target throughput is equal to a weighted average value of the rate thresholds of all the services. There is a correspondence between the rate threshold and the user satisfaction degree. A weighted value of a rate threshold of each service may be set based on the actual situation. This is not limited in this application. In this way, the target throughput may satisfy requirements on the service rate and the user satisfaction degree.

In another optional embodiment, the target throughput corresponds to a target physical resource block utilization, and the target physical resource block utilization is determined based on a traffic suppression point of the historical time period.

Figure 7:
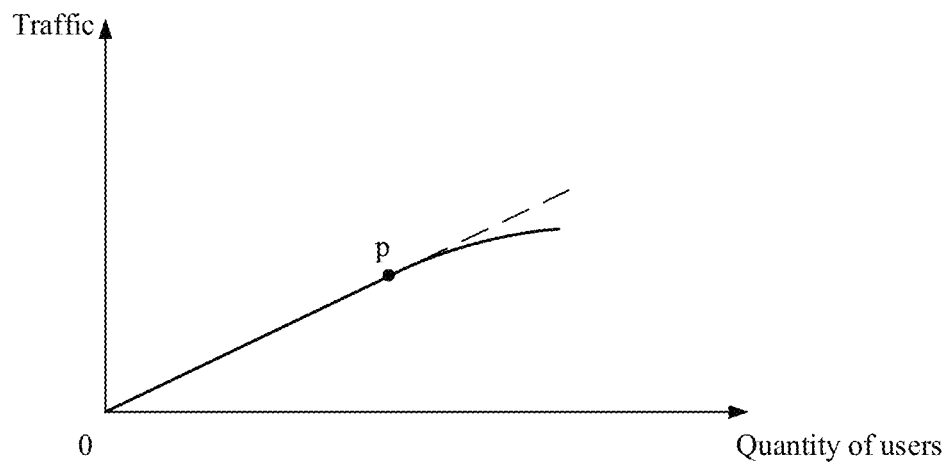
FIG. 7 is a diagram of a traffic suppression point according to an embodiment of this application.

In some embodiments, the traffic suppression point can indicate a maximum quantity of users and maximum traffic in a linear relationship between traffic and a quantity of users. Refer to FIG. 7. Before a traffic suppression point p, the correspondence between the traffic and the quantity of users is the linear relationship. Starting from the traffic suppression point, the correspondence between the traffic and the quantity of users becomes a non-linear relationship.

Specifically, a target quantity of users is determined based on the traffic suppression point, a target physical resource block utilization corresponding to the target quantity of users is determined based on a preset correspondence between the quantity of users and a physical resource block utilization, and a target throughput corresponding to the target physical resource block utilization is determined based on a preset correspondence between the physical resource block utilization and a throughput. In this way, the target throughput can satisfy a specific quantity of users and also satisfy a requirement of the user on a service rate.

In another optional embodiment, the target throughput is determined based on a throughput of the target historical time period and a preset expansion coefficient, and the service data volume of the target historical time period is greater than or equal to a preset data volume.

In some embodiments, the expansion coefficient is a ratio of a throughput of a light-load time period to a throughput of a heavy-load time period. The throughput of the heavy-load time period is usually less than the throughput of the light-load time period. The extension coefficient may be a real number greater than 1, for example, 1.2 or 2. A value of the extension coefficient may be set based on the actual situation. This is not limited in this application.

When the service data volume of the target historical time period is greater than or equal to the preset data volume, it indicates that the target historical time period is a heavy-load time period, and a target throughput obtained through calculation based on the throughput of the target historical time period and the expansion coefficient can satisfy a requirement on a throughput in a light-load scenario. The light-load scenario may be a medium-load scenario or a light-load scenario.

In addition to the foregoing method, the target throughput can alternatively be determined based on a requirement of a customer on a throughput or a requirement of network construction on a throughput.

In another optional embodiment, that the first network device predicts energy consumption of each candidate carrier resource set based on the physical resource block utilization of each candidate carrier resource set and a preset resource energy consumption model includes: The first network device predicts the energy consumption of each candidate carrier resource set based on the physical resource block utilization of each candidate carrier resource set, a quantity of available channels of each working carrier, and the preset resource energy consumption model.

Input data of the resource energy consumption model in some embodiments further includes the quantity of available channels of the working carrier. Because the carrier channel is related to the energy consumption, increasing the quantity of available channels of the working carrier and using the channels as training data of the resource energy consumption model can reduce a prediction error of the resource energy consumption model.

In another optional embodiment, that the first network device selects a target resource information combination from the at least one candidate resource information combination includes: The first network device selects a candidate resource information combination corresponding to the minimum energy consumption from the at least one candidate resource information combination as the target resource information combination.

In some embodiments, after energy consumption of the candidate resource information combinations is obtained, the candidate resource information combination with the minimum energy consumption is selected as the target resource information combination. In this way, the energy consumption can be maintained at minimum, and an energy saving effect is the best.

In another optional embodiment, that the first network device selects a target resource information combination from the at least one candidate resource information combination includes: The first network device determines, based on a traffic loss ratio and a weak coverage ratio that are of each candidate resource information combination, and the energy consumption of the candidate resource information combination, a cost value corresponding to each candidate resource information combination, and determines a target resource information combination corresponding to a minimum cost value from the at least one candidate resource information combination.

In some embodiments, the first network device determines a first cost function value based on the traffic loss ratio of each candidate resource information combination, determines a second cost function value based on the weak coverage ratio of each candidate resource information combination, determines a third cost function value based on the energy consumption of each candidate resource information combination, and determines the cost value corresponding to the candidate resource information combination based on the first cost function value, the second cost function value, and the third cost function value.

The cost value cost corresponding to the candidate resource information combination, the first cost function value Ytraffic, the second cost function value Ypc, and the third cost function value Yps satisfy the following formula:

$$\text{cost} = C_1 * Ytraffic + C_2 * Ypc + C_3 * Yps$$

$C_1$ is a weight of the first cost function value, $C_2$ is a weight of the second cost function value, and $C_3$ is a weight of the third cost function value.

After the cost value corresponding to each candidate resource information combination is calculated, the target resource information combination corresponding to the minimum cost value may be determined by using an offline particle swarm algorithm.

Optionally, that the first network device determines a first cost function value based on the traffic loss ratio of each candidate resource information combination includes: When the traffic loss ratio of the candidate resource information combination is greater than a preset energy saving baseline, the first cost function value is equal to 2000; or when the traffic loss ratio of the candidate resource information combination is less than a preset energy saving baseline, the first cost function value is equal to 0. The energy saving baseline may be but is not limited to 0.1. A value of the energy saving baseline may be set based on the actual situation. This is not limited in this application.

Optionally, that the first network device determines a second cost function value based on the weak coverage ratio of each candidate resource information combination includes: When the weak coverage ratio of the candidate resource information combination is greater than a preset weak coverage ratio, the second cost function value is equal to 2000; or when the weak coverage ratio of the candidate resource information combination is less than or equal to the preset weak coverage ratio, the second cost function value is equal to 0.

Optionally, that the first network device determines a third cost function based on the energy consumption of each candidate resource information combination includes: obtaining historical energy consumption of the N carriers in a to-be-processed historical time period, where duration of the to-be-processed historical time period is equal to target duration and the to-be-processed historical time period is adjacent to the target time period; and determining an energy consumption gain based on the energy consumption of each candidate resource information combination and the foregoing historical energy consumption. When the energy consumption gain of the candidate resource information combination is less than a preset energy consumption gain, the third cost function value is equal to 2000; or when the energy consumption gain of the candidate resource information combination is greater than or equal to a preset energy consumption gain, the third cost function value is equal to 20*(1−PCSavingRatio). PCSavingRatio is the energy consumption gain of the candidate resource information combination. PCSavingRatio=(PC−PCwithES)/PC, where PC is the energy consumption of the candidate resource combination, and PCwithES is the historical energy consumption of the N carriers in the to-be-processed historical time period.

In another optional embodiment, that the first network device selects a target resource information combination from the at least one candidate resource information combination includes: The first network device determines, based on a throughput of a working carrier resource, a traffic loss ratio, and a weak coverage ratio in each candidate resource information combination, and the energy consumption of the candidate resource information combination, a cost value corresponding to each candidate resource information combination, and determines a target resource information combination corresponding to a minimum cost value from the at least one candidate resource information combination.

In some embodiments, the first network device determines a first cost function value based on the traffic loss ratio of each candidate resource information combination, determines a second cost function value based on the weak coverage ratio of each candidate resource information combination, determines a third cost function value based on the energy consumption of each candidate resource information combination, determines a fourth cost function value based on the throughput of each candidate resource information combination, and determines the cost value corresponding to the candidate resource information combination based on the first cost function value, the second cost function value, the third cost function value, and the fourth cost function value.

In some embodiments, the cost value cost corresponding to the candidate resource information combination, the first cost function value Ytraffic, the second cost function value Ypc, the third cost function value Yps, and the fourth cost function value Ythp satisfy the following formula:

$$\text{cost} = C_1 * Ytraffic + C_2 * Ypc + C_3 * Yps + C_4 * Ythp$$

$C_1$ is a weight of the first cost function value, $C_2$ is a weight of the second cost function value, $C_3$ is a weight of the third cost function value, and $C_4$ is a weight of the fourth cost function value.

After the cost value corresponding to each candidate resource information combination is calculated, the minimum cost value may be determined by using an offline particle swarm algorithm, and then the target resource information combination corresponding to the minimum cost value is determined.

Optionally, that the first network device determines a first cost function value based on the traffic loss ratio of each candidate resource information combination includes: When the traffic loss ratio of the candidate resource information combination is greater than a preset energy saving baseline, the first cost function value is equal to 2000; or when the traffic loss ratio of the candidate resource information combination is less than a preset energy saving baseline, the first cost function value is equal to 0. The energy saving baseline may be but is not limited to 0.1. A value of the energy saving baseline may be set based on the actual situation. This is not limited in this application.

Optionally, that the first network device determines a second cost function value based on the weak coverage ratio of each candidate resource information combination includes: When the weak coverage ratio of the candidate resource information combination is greater than a preset weak coverage ratio, the second cost function value is equal to 2000; or when the weak coverage ratio of the candidate resource information combination is less than or equal to the preset weak coverage ratio, the second cost function value is equal to 0.

Optionally, that the first network device determines a third cost function based on the energy consumption of each candidate resource information combination includes: obtaining historical energy consumption of the N carriers in a to-be-processed historical time period, where duration of the to-be-processed historical time period is equal to target duration and the to-be-processed historical time period is adjacent to the target time period; and determining an energy consumption gain based on the energy consumption of each candidate resource information combination and the foregoing historical energy consumption. When the energy consumption gain of the candidate resource information combination is less than a preset energy consumption gain, the third cost function value is equal to 2000; or when the energy consumption gain of the candidate resource information combination is greater than or equal to a preset energy consumption gain, the third cost function value is equal to 20*(1−PCSavingRatio). PCSavingRatio is the energy consumption gain of the candidate resource information combination, and PCSavingRatio=(PC−PCwithES)/PC. PC is the energy consumption of the candidate resource information combination, and PCwithES is the historical energy consumption of the N carriers in the to-be-processed historical time period. The preset energy consumption gain may be set based on the actual situation. This is not limited in this application.

Optionally, that the first network device determines a fourth cost function based on the throughput of each candidate resource information combination includes: When the throughput of the candidate resource information combination is less than a preset throughput, the fourth cost function value is equal to 2000; or when the throughput of the candidate resource information combination is greater than or equal to the target throughput, the fourth cost function value is equal to EXP((Thptarget−Thpsite)/Thptarget).

Thptarget is the target throughput, Thpsite is the throughput of the candidate resource information combination, and EXP is an exponential function whose base is a natural constant e. The preset throughput may be a downlink average rate of the target historical time period, and the service volume of the target historical time period is greater than or equal to the preset data volume.

A smaller cost value corresponding to the candidate resource information combination indicates a better candidate resource combination. A larger cost value corresponding to the candidate resource information combination indicates a poorer candidate resource combination. In an actual application, a weight of the traffic loss ratio, a weight of the weak coverage ratio, a weight of the energy consumption, and a weight of the throughput may be set based on an actual requirement. In this way, the resource information combination with the minimum cost may be selected, and the energy consumption can be saved to some extent.

In the foregoing cost functions, 2000 is used as a maximum value of each cost function. The maximum value of each cost function may be set to different values, and the maximum value may be set based on the actual situation. This is not limited in this application.

In some embodiments of this application, the first network device further includes a resource combination status interface, configured to transmit the target resource information combination to the second network device.

Models in this application include but are not limited to a resource utilization model, a resource energy consumption model, a first preset model, a second preset model, and a third preset model. The following separately describes methods of establishing example models.

1. Resource Utilization Model

Figure 8:
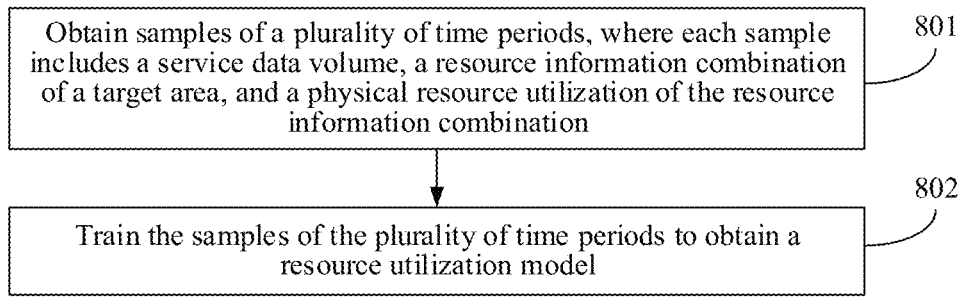
FIG. 8 is a flowchart of establishing a resource utilization model according to an embodiment of this application.

Refer to FIG. 8. An embodiment of a method of establishing the resource utilization model in this application includes the following steps.

Step 801: Obtain samples of a plurality of time periods, where each sample includes a service data volume, a resource information combination of a target area, and a physical resource utilization of the resource information combination.

In some embodiments, a sampling duration of each sample is the same. The sampling duration may be n days, n hours, or n minutes, where n is a positive integer. Duration of a sampling time period may be set based on an actual situation. This is not limited in this application. The resource information combination includes all or a part of carriers in the target area. Because there is no physical resource utilization of a disabled carrier, a physical resource utilization of the resource information combination may be understood as a physical resource utilization of a working carrier in the resource information combination.

Step 802: Train the samples of the plurality of time periods to obtain the resource utilization model.

Input data of the resource utilization model includes a service data volume and a resource information combination. Output data of the resource utilization model is a physical resource block (PRB) utilization. The input data and the output data are trained by using a supervised learning algorithm to obtain the resource utilization model. The supervised learning algorithm may be, but is not limited to, a GBDT algorithm, an xgBoost algorithm, or a random forest algorithm.

2. Resource Energy Consumption Model

Figure 9:
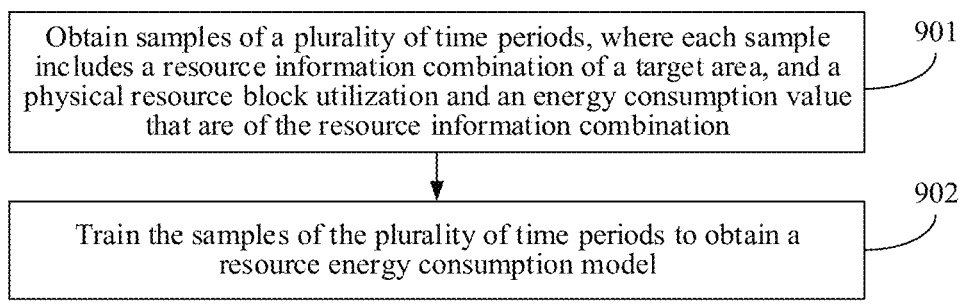
FIG. 9 is a flowchart of establishing a resource energy consumption model according to an embodiment of this application.

Refer to FIG. 9. An embodiment of a method of establishing the resource energy consumption model in this application includes the following steps.

Step 901: Obtain samples of a plurality of time periods, where each sample includes a resource information combination of a target area, and a physical resource block utilization and an energy consumption value that are of the resource information combination.

A sampling duration of each sample is the same. The sampling duration may be n days, n hours, or n minutes, where n is a positive integer. Duration of a sampling time period may be set based on an actual situation. This is not limited in this application. The resource information combination includes all or a part of carriers in the target area.

Step 902: Train the samples of the plurality of time periods to obtain the resource energy consumption model.

Input data of the resource energy consumption model includes carrier resource information and a physical resource block utilization of the carrier resource information. Output data of the resource energy consumption model is an energy consumption value. The input data and the output data are trained by using a supervised learning algorithm to obtain the resource energy consumption model. The supervised learning algorithm may be, but is not limited to, a gradient boosting decision tree (GBDT) algorithm, an xgBoost algorithm, or a random forest algorithm.

3. Preset Model Group

Figure 10:
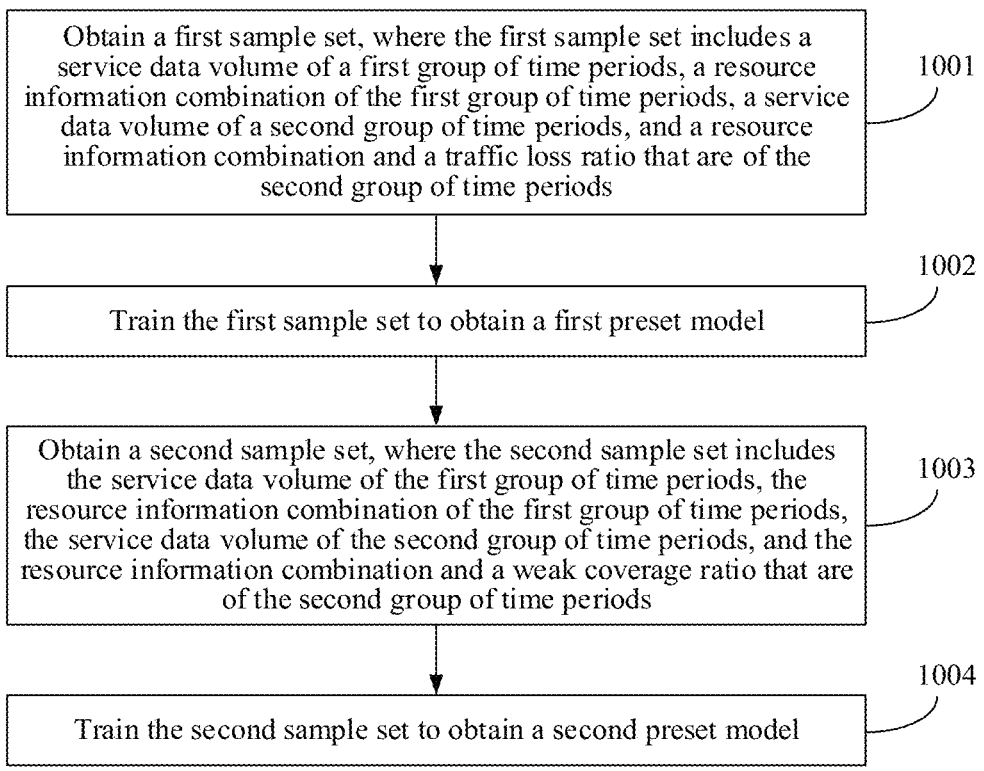
FIG. 10 is a flowchart of establishing a preset model group according to an embodiment of this application.

Refer to FIG. 10. An embodiment of a method of establishing the preset model group in this application includes the following steps.

Step 1001: Obtain a first sample set, where the first sample set includes a service data volume of a first group of time periods, a resource information combination of the first group of time periods, a service data volume of a second group of time periods, and a resource information combination and a traffic loss ratio that are of the second group of time periods.

In some embodiments, the first group of time periods includes N time periods, the second group of time periods includes N time periods, an $i^{th}$ time period in the first group of time periods is a time period before an $i^{th}$ time period in the second group of time periods, and the $i^{th}$ time period in the first group of time periods is adjacent to the $i^{th}$ time period in the second group of time periods. For example, the time periods in the first group of time periods are a first hour, a second hour, ..., and a $23^{rd}$ hour. The time periods in the second group of time periods are a second hour, a third hour, ..., and a $24^{th}$ hour. Each time period in the first group of time periods and the second group of time periods may be but is not limited to n days, n hours, or n minutes. n is a positive integer, and a value of n may be set based on an actual situation. This is not limited in this application. A duration of the first group of time periods may be different from a duration of the second group of time periods. For example, a time period of the first group of time periods is seven days, and a time period of the second group of time periods is one day.

Step 1002: Train the first sample set to obtain a first preset model.

Input data of the first preset model includes the service data volume of the first group of time periods, working carrier information of the first group of time periods, the service data volume of the second group of time periods, and working carrier information of the second group of time periods. Output data is a traffic loss ratio. The input data and the output data are trained by using a supervised learning algorithm to obtain the first preset model. The supervised learning algorithm may be, but is not limited to, a GBDT algorithm, an xgBoost algorithm, or a random forest algorithm.

Step 1003: Obtain a second sample set, where the second sample set includes the service data volume of the first group of time periods, the resource information combination of the first group of time periods, the service data volume of the second group of time periods, and the resource information combination and a weak coverage ratio that are of the second group of time periods.

Step 1004: Train the second sample set to obtain a second preset model.

Input data of the second preset model includes the service data volume of the first group of time periods, the working carrier information of the first group of time periods, the service data volume of the second group of time periods, and the working carrier information of the second group of time periods. Output data is a weak coverage ratio. The input data and the output data are trained by using the supervised learning algorithm to obtain the second preset model. The supervised learning algorithm may be, but is not limited to, the GBDT algorithm, the xgBoost algorithm, or the random forest algorithm.

In some embodiments, the first preset model may predict, based on a service data volume and the resource information combination that are of two time periods, a traffic loss ratio of a resource information combination. The second preset model may predict, based on the service data volume and the resource information combination that are of the two time periods, a weak coverage ratio of the resource information combination. In this way, two KPI parameter values may be output.

It should be noted that a sequence of establishing the first preset model and establishing the second preset model is not fixed, and step 1003 and step 1004 may alternatively be performed before step 1001 or step 1002.

In an optional embodiment, the method further includes: obtaining a third sample set, where each sample in the third sample set includes a service data volume, a resource information combination, and a throughput; and training the third sample set to obtain a third preset model. The third preset model may predict a throughput of a resource information combination.

Input data of the third preset model includes the service data volume of the first group of time periods, the working carrier information of the first group of time periods, the service data volume of the second group of time periods, and the working carrier information of the second group of time periods. Output data is a throughput. The input data and the output data are trained by using the supervised learning algorithm to obtain the third preset model. The supervised learning algorithm may be, but is not limited to, the GBDT algorithm, the xgBoost algorithm, or the random forest algorithm.

It should be understood that, for the input data of each model, data cleaning and data standardization processing may be performed before training.

The following describes an energy saving effect of a device energy saving method in this application based on a specific application scenario.

In a medium-load scenario, when a PRB utilization of a resource information combination of a target area is 20%, and a target rate is not limited, a lossless rate of the target area is 15.1 Mbps, and energy saving space is 10.4%. When the target rate is 8 Mbps, 8.5 Mbps, or 10 Mbps, the energy saving space and an average rate are shown in Table 3.

TABLE 3

| Target rate | — | 8 Mbps | 8.5 Mbps | 10 Mbps |
|---|---|---|---|---|
| Energy saving space | 10.4% | 19.3% | 18.7% | 16.2% |
| Average rate | 15.1 Mbps | 13.7 Mbps | 13.78 Mbps | 13.99 Mbps |
| Energy saving space increment | 0 | +9.1% | +8.5% | +5.8% |

It can be learned from Table 3 that, in the medium-load scenario, the device energy saving method in this application can reduce energy consumption by 5.8% to 9.1%. The average rate maintains to be greater than 90% of the lossless rate. 8.5 Mbps is an average rate in a heavy-load scenario.

In a light-load scenario, when a PRB utilization of a resource information combination of a target area is 5%, a lossless rate is 27.3 Mbps, and energy saving space is 21.7%. When a target rate is 10 Mbps, 13.5 Mbps, or 15 Mbps, the energy saving space and an average rate are shown in Table 4.

TABLE 4

| Target rate | — | 10 Mbps | 13.5 Mbps | 15 Mbps |
|---|---|---|---|---|
| Energy saving space | 21.7% | 33.1% | 32.6% | 31.9% |
| Average rate | 27.3 Mbps | 17.1 Mbps | 17.28 Mbps | 17.54 Mbps |
| Energy saving space increment | 0 | +11.4% | +10.9% | +10.2% |

It can be learned from Table 4 that, in the light-load scenario, the device energy saving method in this application can reduce energy consumption by more than 10%. The average rate maintains to be greater than 62% of the lossless rate. 13.5 Mbps is an average rate in another heavy-load scenario.

Figure 11:
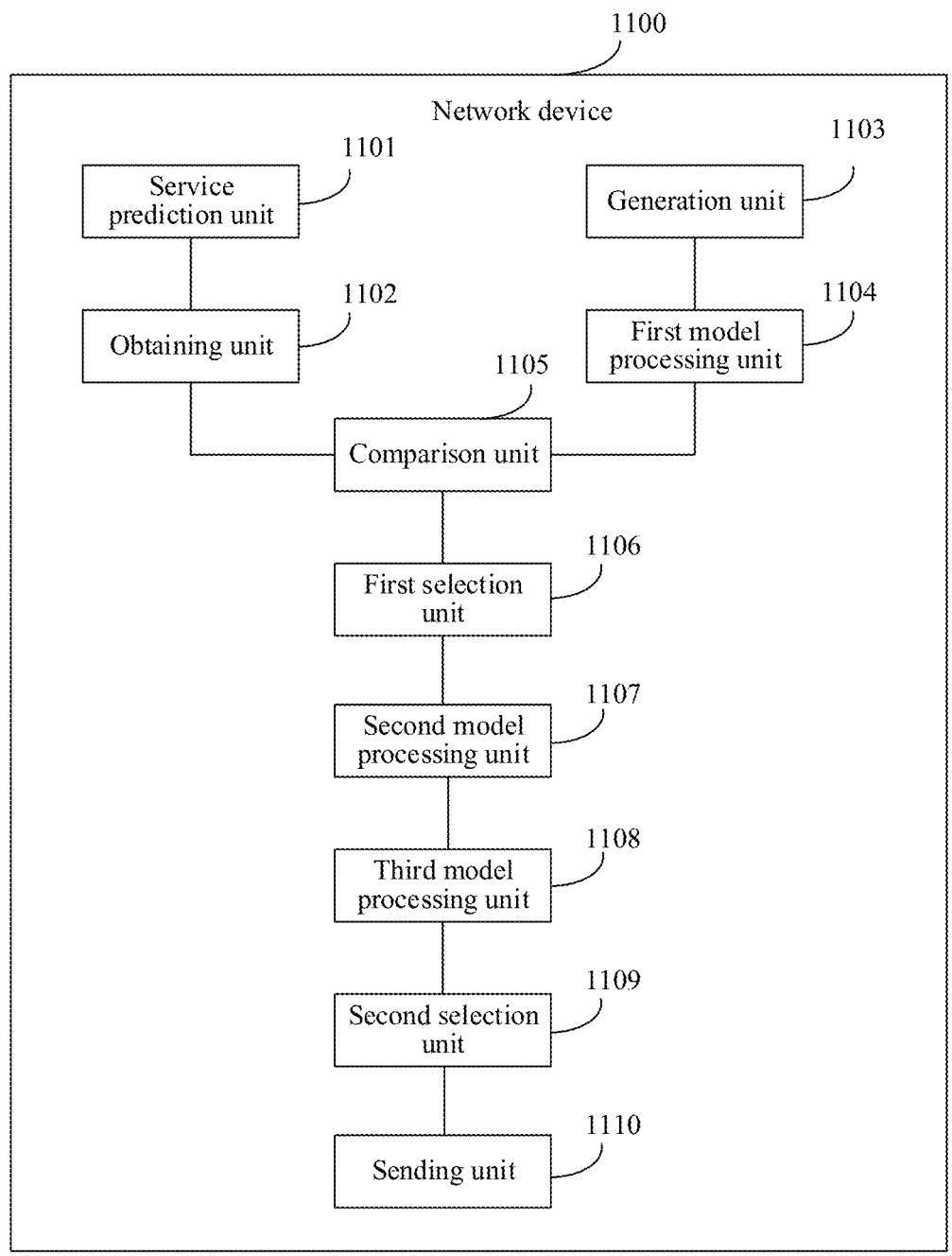
FIG. 11 is a diagram of a structure of a network device according to an embodiment of this application.

A network device in this application may implement steps performed by a first network device in the embodiment shown in FIG. 4A and FIG. 4B or an optional embodiment. Refer to FIG. 11. In an embodiment, a network device 1100 includes:

a service prediction unit 1101, configured to determine a service data volume of a target time period based on a service data volume carried on N carriers in a target area in a historical time period;

an obtaining unit 1102, configured to obtain a target KPI, a preset model group, and a preset condition based on the service data volume of the target time period;

a generation unit 1103, configured to generate M resource information combinations based on carrier resource information of the N carriers, where each resource information combination includes the carrier resource information of the N carriers, and both N and M are integers greater than 1;

a first model processing unit 1104, configured to: sequentially select a resource information combination from the M resource information combinations as a to-be-processed resource information combination, select input data of each model in the preset model group from a model data set, and input the input data of each model into a corresponding model in the preset model group, where the model data set includes signal quality information of the historical time period, the service data volume of the historical time period, a resource information combination of the historical time period, the service data volume of the target time period, and the to-be-processed resource information combination, and each model in the preset model group is for outputting a parameter value in a KPI corresponding to the to-be-processed resource information combination;

a comparison unit 1105, configured to compare the KPI of each resource information combination with the target KPI;

a first selection unit 1106, configured to select at least one candidate resource information combination from the plurality of resource information combinations based on a comparison result that satisfies the preset condition;

a second model processing unit 1107, configured to input the service data volume of the target time period and the candidate resource information combination into a resource utilization model, where the resource utilization model is for outputting a physical resource block utilization of the candidate resource information combination;

a third model processing unit 1108, configured to predict energy consumption of each candidate resource information combination based on the physical resource block utilization of each candidate resource information combination and a preset resource energy consumption model;

a second selection unit 1109, configured to select a target resource information combination from the at least one candidate resource information combination, where energy consumption of the target resource information combination is less than or equal to preset energy consumption; and a sending unit 1110, configured to send the target resource information combination to a second network device, where the target resource information combination is for adjusting, in the target time period, a carrier resource corresponding to the target resource information combination.

In an optional embodiment, the obtaining unit 1102 is configured to: when the service data volume of the target time period is less than or equal to a first data volume, obtain the target KPI including a target traffic loss ratio and a target weak coverage ratio, the preset model group including a first preset model and a second preset model, and the preset condition including a first rule and a second rule, where the first preset model is for outputting a traffic loss ratio corresponding to each resource information combination, the second preset model is for outputting a weak coverage ratio corresponding to each resource information combination, the first rule is that the traffic loss ratio of the resource information combination is less than or equal to the target traffic loss ratio, and the second rule is that the weak coverage ratio of the resource information combination is less than or equal to the target weak coverage ratio.

In another optional embodiment, the obtaining unit 1102 is configured to: when the service data volume of the target time period is greater than a first data volume and is less than or equal to a second data volume, obtain the target KPI including a target traffic loss ratio, a target weak coverage ratio, and a target throughput, the preset model group including a first preset model, a second preset model, and a third preset model, and the preset condition including a first rule, a second rule, and a third rule, where the first preset model is for outputting a traffic loss ratio corresponding to each resource information combination, the second preset model is for outputting a weak coverage ratio corresponding to each resource information combination, the third preset model is for outputting a throughput corresponding to each resource information combination, the first rule is that the traffic loss ratio of the resource information combination is less than or equal to the target traffic loss ratio, the second rule is that the weak coverage ratio of the resource information combination is less than or equal to the target weak coverage ratio, and the third rule is that the throughput of the resource information combination is greater than or equal to the target throughput.

Optionally, the target throughput is determined based on a service experience rate of the historical time period and a preset satisfaction degree.

In another optional manner, the target throughput corresponds to a target physical resource block utilization, and the target physical resource block utilization is determined based on a traffic suppression point of the historical time period.

In another optional manner, the target throughput is determined based on a throughput of the target historical time period and a preset expansion coefficient, and the service data volume of the target historical time period is greater than or equal to a preset data volume.

In another optional embodiment, the first model processing unit 1104 is configured to: when the preset model group includes the first preset model and the second preset model, select, for the first network device, the service data volume of the historical time period, the resource information combination of the historical time period, the service data volume of the target time period, and the to-be-processed resource information combination from the model data set as input data of the first preset model, and select the signal quality information of the historical time period, the service data volume of the historical time period, the resource information combination of the historical time period, the service data volume of the target time period, and the to-be-processed resource information combination from the model data set as input data of the second preset model; or when the preset model group includes the first preset model, the second preset model, and the third preset model, select the service data volume of the historical time period, the resource information combination of the historical time period, the service data volume of the target time period, and the to-be-processed resource information combination from the model data set as input data of the first preset model, select the signal quality information of the historical time period, the service data volume of the historical time period, the resource information combination of the historical time period, the service data volume of the target time period, and the to-be-processed resource information combination from the model data set as input data of the second preset model, and select the service data volume of the target time period and the to-be-processed resource information combination from the model data set as input data of the third preset model.

In another optional embodiment, the third model processing unit 1108 is configured to predict the energy consumption of each candidate carrier resource set based on the physical resource block utilization of each candidate carrier resource set, a quantity of available channels of each working carrier, and the preset resource energy consumption model.

In another optional embodiment, the second selection unit 1109 is configured to select a candidate resource information combination corresponding to minimum energy consumption from the at least one candidate resource information combination as the target resource information combination.

In another optional embodiment, the second selection unit 1109 is configured to: determine, based on a traffic loss ratio and a weak coverage ratio that are of each candidate resource information combination, and the energy consumption of the candidate resource information combination, a cost value corresponding to each candidate resource information combination, and determine a target resource information combination corresponding to a minimum cost value from the at least one candidate resource information combination.

In another optional embodiment, the second selection unit 1109 is configured to: determine, based on a throughput of a working carrier resource, a traffic loss ratio, and a weak coverage ratio in each candidate resource information combination, and the energy consumption of the candidate resource information combination, a cost value corresponding to each candidate resource information combination, and determine a target resource information combination corresponding to a minimum cost value from the at least one candidate resource information combination.

In another optional embodiment, the network device 1100 further includes a resource combination status interface, configured to transmit the target resource information combination to the second network device.

For term explanations, steps performed by the units, and beneficial effects that are in the embodiment shown in FIG. 11, refer to corresponding descriptions in the embodiment shown in FIG. 4A and FIG. 4B.

Figure 12:
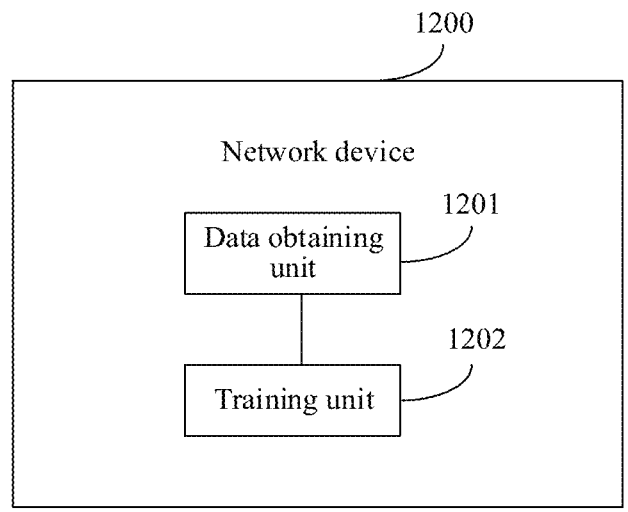
FIG. 12 is a diagram of another structure of a network device according to an embodiment of this application.

Refer to FIG. 12. This application further provides a network device. The network device 1200 includes a data obtaining unit 1201 and a training unit 1202.

In an optional embodiment, the data obtaining unit 1201 is configured to obtain samples of a plurality of time periods, where each sample includes a service data volume, carrier resource information of N carriers in a target area, and a physical resource utilization of the carrier resource information. The training unit 1202 is configured to train the samples of the plurality of time periods to obtain a resource utilization model.

In another embodiment, the data obtaining unit 1201 is configured to obtain samples of a plurality of time periods, where each sample includes a resource information combination of a target area, and a physical resource block utilization and an energy consumption value that are of each resource information combination. The training unit 1202 is configured to train the samples of the plurality of time periods to obtain a resource energy consumption model.

In another embodiment, the data obtaining unit 1201 is configured to obtain a first sample set, where the first sample set includes a service data volume of a first group of time periods, carrier resource information of the first group of time periods, a service data volume of a second group of time periods, and carrier resource information and a traffic loss ratio that are of the second group of time periods. The training unit 1202 is configured to train the first sample set to obtain a first preset model. The data obtaining unit 1201 is further configured to obtain a second sample set, where the second sample set includes the service data volume of the first group of time periods, the carrier resource information of the first group of time periods, the service data volume of the second group of time periods, the carrier resource information and a weak coverage ratio that are of the second group of time periods. The training unit 1202 is further configured to train the second sample set to obtain a second preset model.

In an optional embodiment, the data obtaining unit 1201 is configured to obtain a third sample set, where each sample in the third sample set includes a service data volume, a resource information combination, and a throughput. The training unit 1202 is configured to train the third sample set to obtain a third preset model.

The network device shown in FIG. 12 can implement the method in the embodiment shown in FIG. 8, FIG. 9, or FIG. 10. For term explanations, steps performed by the units, and beneficial effects that are in the embodiment shown in FIG. 12, refer to corresponding descriptions in the method in the embodiment shown in FIG. 8, FIG. 9, or FIG. 10.

Figure 13:
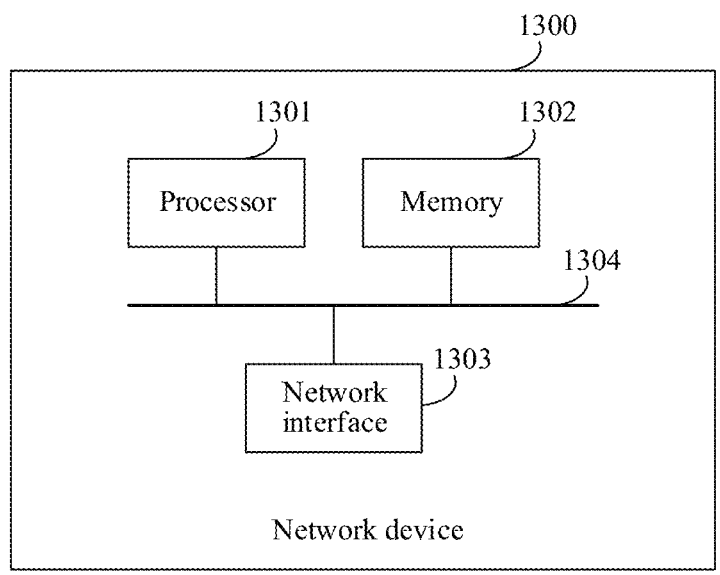
FIG. 13 is a diagram of another structure of a network device according to an embodiment of this application.

The following describes a hardware structure of a network device in this application. Refer to FIG. 13. An embodiment of a network device 1300 in this application includes:

a processor 1301, a memory 1302, and a network interface 1303 that are connected through a bus 1304. There may be one or more processors 1301, memories 1302, and network interfaces 1303.

In some embodiments, the memory 1302 is configured to store a program or instructions. By invoking the program or the instructions stored in the memory 1302, the processor 1301 is configured to perform the steps performed by the first network device in the embodiment shown in FIG. 4A and FIG. 4B or an optional embodiment, the method of establishing the resource utilization model in the embodiment shown in FIG. 8, the method of establishing the resource energy consumption model in the embodiment shown in FIG. 9, or the method of establishing the preset model group in the embodiment shown in FIG. 10.

It should be understood that the processor 1301 mentioned In some embodiments may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory 1302 mentioned In some embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example rather than limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM).

The network interface 1303 may be configured to receive data or send data.

It should be noted that because content such as information exchange between the modules/units of the apparatus and the execution processes thereof is based on a same idea as the method embodiment of this application, technical effects brought are the same as those of the method embodiment of this application. For specific content, refer to the descriptions in the foregoing method embodiment of this application. Details are not described herein again.

This application provides a computer-readable storage medium. The computer-readable storage medium stores a computer program. When the computer program is run on a computer, the computer is enabled to perform the device energy saving method in the foregoing embodiment or an optional embodiment.

This application further provides a computer program product. When the computer program product runs on a computer, the computer is enabled to perform the device energy saving method in the foregoing embodiment or an optional embodiment.

This application further provides a chip system. The chip system includes a processor and a memory that are coupled to each other. The memory is configured to store a computer program or instructions. The processing unit is configured to execute the computer program or the instructions stored in the memory, to enable a measurement device to perform the steps performed by the measurement device in the foregoing embodiments. Optionally, the memory is a memory in a chip, such as a register or a cache. The memory may alternatively be a memory that is located outside the chip and that is in a site, such as a read-only memory (ROM), another type of static storage device that can store static information and instructions, or a random access memory (RAM). The processor mentioned anywhere above may be a general-purpose central processing unit, a microprocessor, an application-specific integrated circuit (ASIC), or one or more integrated circuits configured to implement the foregoing device energy saving method.

In addition, it should be noted that the apparatus embodiments described above are merely examples. The units described as separate parts may or may not be physically separate, and parts displayed as units may or may not be physical units, may be located in one place, or may be distributed on a plurality of network units. Some or all modules may be selected based on an actual requirement to achieve the objectives of the solutions of embodiments. In addition, in the accompanying drawings of the apparatus embodiments provided in this application, connection relationships between modules indicate that the modules have communication connections with each other, and may be implemented as one or more communication buses or signal cables.

Based on the descriptions of the foregoing implementations, persons skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any function that is performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in embodiments of this application.

All or some of the foregoing embodiments may be implemented by using software, hardware, firmware, or any combination thereof. When the software is used to implement embodiments, all or some embodiments may be implemented in a form of a computer program product.

The computer program product includes one or more computer instructions. When the computer program instructions are loaded and executed on the computer, all or some procedures or functions according to embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing embodiments are merely intended to describe the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A device energy saving method, comprising:
   determining, by a first network device, a service data volume of a target time period based on a service data volume carried on N carriers in a target area in a historical time period;
   obtaining, by the first network device, a target key performance indicator (KPI), a preset model group, and a preset condition based on the service data volume of the target time period;
   generating, by the first network device, M resource information combinations based on carrier resource information of the N carriers, wherein each resource information combination comprises the carrier resource information of the N carriers, and both N and M are integers greater than 1;
   sequentially selecting, by the first network device, a resource information combination from the M resource information combinations as a to-be-processed resource information combination;
   selecting, by the first network device, input data of each model in the preset model group from a model data set, wherein the model data set comprises signal quality information of the historical time period, the service data volume of the historical time period, a resource information combination of the historical time period, the service data volume of the target time period, and the to-be-processed resource information combination;

inputting, by the first network device, the input data of each model into a corresponding model in the preset model group, wherein each model in the preset model group is for outputting a parameter value in a KPI of the to-be-processed resource information combination;

comparing, by the first network device, the KPI of each resource information combination with the target KPI;

selecting, by the first network device, at least one candidate resource information combination from the plurality of resource information combinations based on a comparison result that satisfies the preset condition;

inputting, by the first network device, the service data volume of the target time period and the candidate resource information combination into a preset resource utilization model, wherein the resource utilization model is for outputting a physical resource block utilization of the candidate resource information combination;

predicting, by the first network device, energy consumption of each candidate resource information combination based on the physical resource block utilization of each candidate resource information combination and a preset resource energy consumption model;

selecting, by the first network device, a target resource information combination from the at least one candidate resource information combination, wherein energy consumption of the target resource information combination is less than or equal to preset energy consumption.

2. The method according to claim 1, wherein the obtaining, by the first network device, of the target KPI, the preset model group, and the preset condition based on the service data volume of the target time period comprises:

when the service data volume of the target time period is less than or equal to a first data volume, obtaining, by the first network device, the target KPI comprising a target traffic loss ratio and a target weak coverage ratio, the preset model group comprising a first preset model and a second preset model, and the preset condition comprising a first rule and a second rule, wherein the first preset model is for outputting a traffic loss ratio corresponding to each resource information combination, the second preset model is for outputting a weak coverage ratio corresponding to each resource information combination, the first rule is that the traffic loss ratio of the resource information combination is less than or equal to the target traffic loss ratio, and the second rule is that the weak coverage ratio of the resource information combination is less than or equal to the target weak coverage ratio.

3. The method according to claim 1, wherein the obtaining, by the first network device, of the target KPI, the preset model group, and the preset condition based on the service data volume of the target time period comprises:

when the service data volume of the target time period is greater than a first data volume and less than or equal to a second data volume, obtaining, by the first network device, the target KPI comprising a target traffic loss ratio, a target weak coverage ratio, and a target throughput, the preset model group comprising a first preset model, a second preset model, and a third preset model, and the preset condition comprising a first rule, a second rule, and a third rule, wherein the first preset model is for outputting a traffic loss ratio corresponding to each resource information combination, the second preset model is for outputting a weak coverage ratio corresponding to each resource information combination, the third preset model is for outputting a throughput corresponding to each resource information combination, the first rule is that the traffic loss ratio of the resource information combination is less than or equal to the target traffic loss ratio, the second rule is that the weak coverage ratio of the resource information combination is less than or equal to the target weak coverage ratio, and the third rule is that the throughput of the resource information combination is greater than or equal to the target throughput.

4. The method according to claim 3, wherein the target throughput is determined based on a service experience rate of the historical time period and a preset satisfaction degree.

5. The method according to claim 3, wherein the target throughput corresponds to a target physical resource block utilization, and the target physical resource block utilization is determined based on a traffic suppression point of the historical time period.

6. The method according to claim 3, wherein the target throughput is determined based on a throughput of the historical time period and a preset expansion coefficient, and the service data volume of the historical time period is greater than or equal to a preset data volume.

7. The method according to claim 1, wherein the selecting, by the first network device, of the input data of each model in the preset model group from a model data set comprises:

when the preset model group comprises the first preset model and the second preset model, selecting, by the first network device, the service data volume of the historical time period, the resource information combination of the historical time period, the service data volume of the target time period, and the to-be-processed resource information combination from the model data set as input data of the first preset model, and selecting the signal quality information of the historical time period, the service data volume of the historical time period, the resource information combination of the historical time period, the service data volume of the target time period, and the to-be-processed resource information combination from the model data set as input data of the second preset model; or when the preset model group comprises the first preset model, the second preset model, and the third preset model, selecting, by the first network device, the service data volume of the historical time period, the resource information combination of the historical time period, the service data volume of the target time period, and the to-be-processed resource information combination from the model data set as input data of the first preset model, selecting the signal quality information of the historical time period, the service data volume of the historical time period, the resource information combination of the historical time period, the service data volume of the target time period, and the to-be-processed resource information combination from the model data set as input data of the second preset model, and selecting the service data volume of the target time period and the to-be-processed resource information combination from the model data set as input data of the third preset model.

8. The method according to claim 1, wherein the predicting, by the first network device, of the energy consumption of each candidate carrier resource set based on the physical resource block utilization of each candidate carrier resource set and a preset resource energy consumption model comprises:
    predicting, by the first network device, the energy consumption of each candidate carrier resource set based on the physical resource block utilization of each candidate carrier resource set, a quantity of available channels of each working carrier, and the preset resource energy consumption model.

9. The method according to claim 1, wherein the selecting, by the first network device, of the target resource information combination from the at least one candidate resource information combination comprises:
    selecting, by the first network device, a candidate resource information combination corresponding to minimum energy consumption from the at least one candidate resource information combination as the target resource information combination.

10. The method according to claim 2, wherein the selecting, by the first network device, of the target resource information combination from the at least one candidate resource information combination comprises:
    determining, by the first network device based on a traffic loss ratio and a weak coverage ratio that are of each candidate resource information combination, and the energy consumption of the candidate resource information combination, a cost value corresponding to each candidate resource information combination; and
    determining a target resource information combination corresponding to a minimum cost value from the at least one candidate resource information combination.

11. A first network device, comprising:
    at least one processor; and
    one or more memories including computer instructions that, when executed by the at least one processor, cause the first network device to perform operations comprising:
    determining a service data volume of a target time period based on a service data volume carried on N carriers in a target area in a historical time period;
    obtaining a target key performance indicator (KPI), a preset model group, and a preset condition based on the service data volume of the target time period;
    generating M resource information combinations based on carrier resource information of the N carriers, wherein each resource information combination comprises the carrier resource information of the N carriers, and both N and M are integers greater than 1;
    sequentially selecting a resource information combination from the M resource information combinations as a to-be-processed resource information combination;
    selecting input data of each model in the preset model group from a model data set, wherein the model data set comprises signal quality information of the historical time period, the service data volume of the historical time period, a resource information combination of the historical time period, the service data volume of the target time period, and the to-be-processed resource information combination;
    inputting the input data of each model into a corresponding model in the preset model group, wherein each model in the preset model group is for outputting a parameter value in a KPI of the to-be-processed resource information combination;
    comparing the KPI of each resource information combination with the target KPI;
    selecting at least one candidate resource information combination from the plurality of resource information combinations based on a comparison result that satisfies the preset condition;
    inputting the service data volume of the target time period and the candidate resource information combination into a preset resource utilization model, wherein the resource utilization model is for outputting a physical resource block utilization of the candidate resource information combination;
    predicting energy consumption of each candidate resource information combination based on the physical resource block utilization of each candidate resource information combination and a preset resource energy consumption model;
    selecting a target resource information combination from the at least one candidate resource information combination, wherein energy consumption of the target resource information combination is less than or equal to preset energy consumption; and
    sending the target resource information combination to a second network device, wherein the target resource information combination is for adjusting, in the target time period, a carrier resource corresponding to the target resource information combination.

12. The first network device according to claim 11, wherein the obtaining of the target KPI, the preset model group, and the preset condition based on the service data volume of the target time period comprises:
    when the service data volume of the target time period is less than or equal to a first data volume, obtaining the target KPI comprising a target traffic loss ratio and a target weak coverage ratio, the preset model group comprising a first preset model and a second preset model, and the preset condition comprising a first rule and a second rule, wherein
    the first preset model is for outputting a traffic loss ratio corresponding to each resource information combination, the second preset model is for outputting a weak coverage ratio corresponding to each resource information combination, the first rule is that the traffic loss ratio of the resource information combination is less than or equal to the target traffic loss ratio, and the second rule is that the weak coverage ratio of the resource information combination is less than or equal to the target weak coverage ratio.

13. The first network device according to claim 11, wherein the obtaining of the target KPI, the preset model group, and the preset condition based on the service data volume of the target time period comprises:
    when the service data volume of the target time period is greater than a first data volume and less than or equal to a second data volume, obtaining the target KPI comprising a target traffic loss ratio, a target weak coverage ratio, and a target throughput, the preset model group comprising a first preset model, a second preset model, and a third preset model, and the preset condition comprising a first rule, a second rule, and a third rule, wherein
    the first preset model is for outputting a traffic loss ratio corresponding to each resource information combination, the second preset model is for outputting a weak coverage ratio corresponding to each resource information combination, the third preset model is for outputting a throughput corresponding to each resource information combination, the first rule is that the traffic loss ratio of the resource information combination is less than or equal to the target traffic loss ratio, the second rule is that the weak coverage ratio of the resource information combination is less than or equal to the target weak coverage ratio, and the third rule is that the throughput of the resource information combination is greater than or equal to the target throughput.

14. The first network device according to claim 13, wherein the target throughput is determined based on a service experience rate of the historical time period and a preset satisfaction degree.

15. The first network device according to claim 13, wherein the target throughput corresponds to a target physical resource block utilization, and the target physical resource block utilization is determined based on a traffic suppression point of the historical time period.

16. The first network device according to claim 13, wherein the target throughput is determined based on a throughput of the historical time period and a preset expansion coefficient, and the service data volume of the historical time period is greater than or equal to a preset data volume.

17. The first network device according to claim 11, wherein the selecting input data of each model in the preset model group from a model data set comprises:
when the preset model group comprises the first preset model and the second preset model, selecting the service data volume of the historical time period, the resource information combination of the historical time period, the service data volume of the target time period, and the to-be-processed resource information combination from the model data set as input data of the first preset model, and selecting the signal quality information of the historical time period, the service data volume of the historical time period, the resource information combination of the historical time period, the service data volume of the target time period, and the to-be-processed resource information combination from the model data set as input data of the second preset model; or
when the preset model group comprises the first preset model, the second preset model, and the third preset model, selecting the service data volume of the historical time period, the resource information combination of the historical time period, the service data volume of the target time period, and the to-be-processed resource information combination from the model data set as input data of the first preset model, selecting the signal quality information of the historical time period, the service data volume of the historical time period, the resource information combination of the historical time period, the service data volume of the target time period, and the to-be-processed resource information combination from the model data set as input data of the second preset model, and selecting the service data volume of the target time period and the to-be-processed resource information combination from the model data set as input data of the third preset model.

18. The first network device according to claim 11, wherein the predicting of the energy consumption of each candidate carrier resource set based on the physical resource block utilization of each candidate carrier resource set and a preset resource energy consumption model comprises:
predicting the energy consumption of each candidate carrier resource set based on the physical resource block utilization of each candidate carrier resource set, a quantity of available channels of each working carrier, and the preset resource energy consumption model.

19. The first network device according to claim 11, wherein the selecting of the target resource information combination from the at least one candidate resource information combination comprises:
selecting a candidate resource information combination corresponding to minimum energy consumption from the at least one candidate resource information combination as the target resource information combination.

20. A non-transitory computer-readable storage medium, wherein the computer-readable storage medium stores instructions, and when the instructions are run on a computer, the computer is enabled to perform operations comprising:
determining a service data volume of a target time period based on a service data volume carried on N carriers in a target area in a historical time period;
obtaining a target key performance indicator (KPI), a preset model group, and a preset condition based on the service data volume of the target time period;
generating M resource information combinations based on carrier resource information of the N carriers, wherein each resource information combination comprises the carrier resource information of the N carriers, and both N and M are integers greater than 1;
sequentially selecting a resource information combination from the M resource information combinations as a to-be-processed resource information combination;
selecting input data of each model in the preset model group from a model data set, wherein the model data set comprises signal quality information of the historical time period, the service data volume of the historical time period, a resource information combination of the historical time period, the service data volume of the target time period, and the to-be-processed resource information combination;
inputting the input data of each model into a corresponding model in the preset model group, wherein each model in the preset model group is for outputting a parameter value in a KPI of the to-be-processed resource information combination;
comparing the KPI of each resource information combination with the target KPI;
selecting at least one candidate resource information combination from the plurality of resource information combinations based on a comparison result that satisfies the preset condition;
inputting the service data volume of the target time period and the candidate resource information combination into a preset resource utilization model, wherein the resource utilization model is for outputting a physical resource block utilization of the candidate resource information combination;
predicting energy consumption of each candidate resource information combination based on the physical resource block utilization of each candidate resource information combination and a preset resource energy consumption model;
selecting a target resource information combination from the at least one candidate resource information combination, wherein energy consumption of the target resource information combination is less than or equal to preset energy consumption; and
sending the target resource information combination to a second network device, wherein the target resource information combination is for adjusting, in the target time period, a carrier resource corresponding to the target resource information combination.

\* \* \* \* \*